(12) United States Patent
Itoh et al.

(10) Patent No.: US 6,831,661 B1
(45) Date of Patent: Dec. 14, 2004

(54) PROJECTION DISPLAY APPARATUS, DISPLAY METHOD FOR SAME AND IMAGE DISPLAY APPARATUS

(75) Inventors: Takafumi Itoh, Matsumoto (JP); Shoichi Akaiwa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 09/632,221

(22) Filed: Aug. 3, 2000

Related U.S. Application Data

(63) Continuation of application No. PCT/JP99/00467, filed on Feb. 3, 1999.

(30) Foreign Application Priority Data

| Feb. 3, 1998 | (JP) | 10-036716 |
| Jul. 15, 1998 | (JP) | 10-218619 |

(51) Int. Cl.$^7$ ................................................ G09G 5/00
(52) U.S. Cl. ............... 345/629; 345/625; 345/628; 345/634; 345/636; 345/638; 382/173; 382/282; 382/283; 382/284
(58) Field of Search ................ 345/625, 628, 345/629, 634, 636, 638; 382/173, 282, 283, 284

(56) References Cited

U.S. PATENT DOCUMENTS

| 4,835,532 | A | * | 5/1989 | Fant | 345/611 |
| 5,003,616 | A | * | 3/1991 | Orita et al. | |
| 5,633,755 | A | * | 5/1997 | Manabe et al. | 359/443 |
| 5,757,980 | A | * | 5/1998 | Sugiura | 382/284 |
| 6,097,840 | A | * | 8/2000 | Shiitani et al. | 382/203 |
| 6,222,593 | B1 | * | 4/2001 | Higurashi et al. | 348/745 |
| 6,389,155 | B2 | * | 5/2002 | Funayama et al. | 382/118 |

FOREIGN PATENT DOCUMENTS

| JP | 56-27195 | 3/1981 |
| JP | 56-067445 | 6/1981 |
| JP | 59-276 | 1/1984 |
| JP | 60-176093 | 9/1985 |
| JP | 60-232597 | 11/1985 |
| JP | 62-276672 | 12/1987 |
| JP | 4-168478 | 6/1992 |
| JP | 4-205476 | 7/1992 |
| JP | 4-284495 | 10/1992 |
| JP | 5-046135 | 2/1993 |
| JP | 5-183853 | 7/1993 |
| JP | 6-86165 | 3/1994 |
| JP | 6-295339 | 10/1994 |
| JP | 8-69271 | 3/1996 |

* cited by examiner

*Primary Examiner*—Matthew C. Bella
(74) *Attorney, Agent, or Firm*—Oblon, Spivak, McClelland, Maier & Neustadt, P.C.

(57) ABSTRACT

The present invention provides a technology that enables related portions of multiple pages of images to be displayed simultaneously. A projection display apparatus comprises: an image extraction section that extracts at least a portion of given first image data as an extraction image; an extraction image memory for storing extraction image data representing the extraction image; an image overlay section that generates overlaid image data by superimposing the extraction image on an original image represented by given second image data; a light modulation unit that is driven responsive to the overlaid image data pixel by pixel; and an optical system for projecting onto the screen the overlaid image obtained by the light modulation unit. A projection display apparatus can display related portions of multiple pages of images simultaneously.

11 Claims, 26 Drawing Sheets

CPD1 (A)
Product Information

CPD1 (B)

CPD1 (C)

Fig. 29
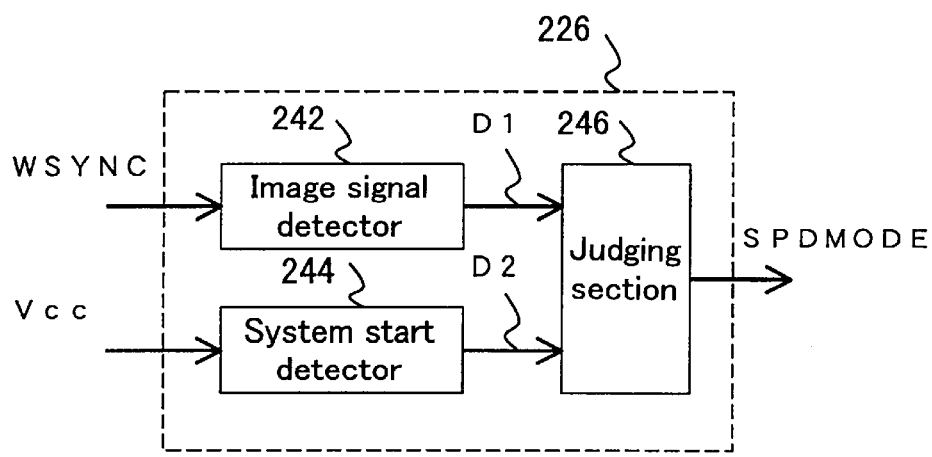
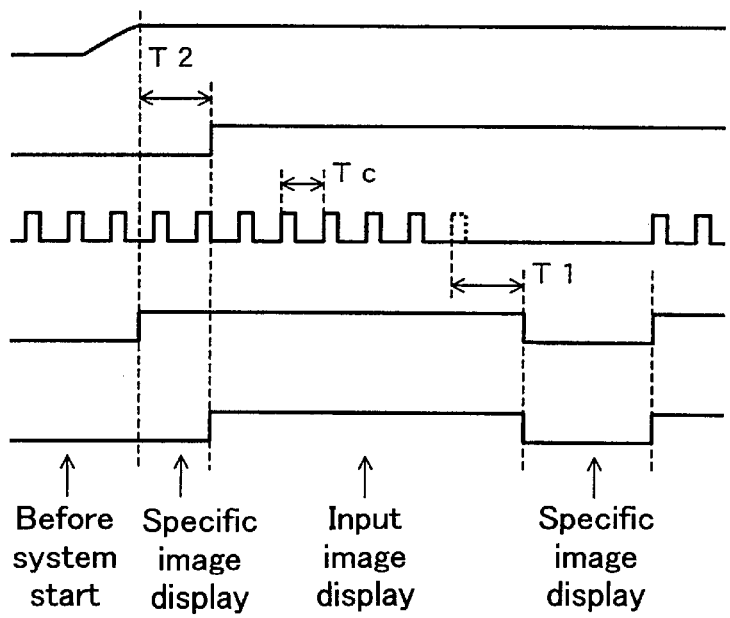

US 6,831,661 B1

PROJECTION DISPLAY APPARATUS, DISPLAY METHOD FOR SAME AND IMAGE DISPLAY APPARATUS

This application is a continuation of application PCT/JP99/00467 filed on Feb. 3, 1999.

TECHNICAL FIELD

The present invention relates to an image display apparatus, and more particularly to a projection display apparatus technology.

BACKGROUND ART

The ability of a projection display apparatus to take input images and display them enlarged on a screen has led to the extensive use for presentations. In a presentation a commentary accompanies the images projected onto the screen. Generally, multiple pages of presentation images are used. While each page of presentation images is different, usually a number of the images are interrelated, so it is necessary to cut back and forth between related presentation pages. Therefore, users want to be able to simultaneously display at least some of multiple pages of interrelated presentation images.

Also, during question and answer sessions or when a short time is needed before a new set of images can be displayed, companies like to display corporate logos, products and other such images (which will also be referred to as specific images) instead of presentation images. In the prior art, specific images were supplied to the projection display apparatus via an image source apparatus such as a computer, video player, TV receiver or the like. Thus, the problem has been that the specific image data has had to be stored beforehand in the image source apparatus connected to the projection display apparatus.

When no images are being input to the projection display apparatus the screen remains blank. In such situations, in the prior art the projection display apparatus displays a one-color screen image called a blank image. In this situation too, users have expressed a desire to display specific images. However, this has not been possible because normal images are not being input from the image source apparatus. This problem is not limited to the projection display apparatus, but is also shared by image display apparatus that display images supplied externally.

DISCLOSURE OF THE INVENTION

This invention was accomplished to overcome the foregoing problems of the prior art. A first object of the invention is to provide a technology that enables related portions of multiple pages of images to be displayed simultaneously. A second object is to provide a technology that enables specific images to be displayed even when the specific images are not supplied externally.

In accordance with a first aspect of this invention, the above object is attained by a projection display apparatus that comprises: an image extraction section that extracts at least a portion of given first image data as an extraction image; an extraction image memory for storing extraction image data representing the extraction image; an image overlay section that generates overlaid image data by superimposing the extraction image on original image represented by given second image data; a light modulation unit that is driven responsive to the overlaid image data pixel by pixel; and an optical system for projecting onto the screen the overlaid image obtained by the light modulation unit.

Since this projection display apparatus contains a section for extracting at least a portion of a given image, and an image overlay section for superimposing the extracted image on the original image, it is possible to simultaneously display multiple pages of interrelated image portions.

It is preferable that the image extraction section can arbitrarily set the portion to be extracted from the first image data, since this makes it easier to produce extraction image data for a particular purpose.

It should also be possible for the image overlay section to superimpose the extraction image at a desired position on the original image, since that provides more freedom with respect to overlaying extraction images.

It is also preferable that the extraction image memory stores a plurality of extraction image data representing a plurality of extraction images, and the image overlay section superimposes at least one selected extraction image at each specified position on the original image.

Doing this makes it possible to select an arbitrary extraction image from among a plurality of extraction images, enabling a desired extraction image to be overlaid on an original image.

It is preferable for the image overlay section used in the projection display apparatus to be equipped with a synthesizer section that generates the overlaid image data by synthesizing the given second image data and the extraction image data read out from the extraction image memory; and a frame memory for storing the overlaid image data, the frame memory having at least a memory area corresponding to all the pixels of the light modulation unit. In this case, the overlaid image data read out of the frame memory is supplied to the light modulation unit.

With this configuration, since image data consisting of the extraction images superimposed on the original image is written to a frame memory, the overlaid image can be obtained by reading the overlaid image data from the frame memory.

Alternatively, It is preferable for the image overlay section used in the projection display apparatus to be equipped with a frame memory for storing the given second image data, the frame memory having at least a memory area corresponding to all the pixels of the light modulation unit; and a synthesizer section that generates the overlaid image data by synthesizing the second image data read out from the frame memory and the extraction image data read out from the extraction image memory, with the overlaid image data synthesized by the synthesizer section being supplied to the light modulation unit.

This configuration allows the overlaid image data to be obtained in the projection display apparatus. Thus, this projection display apparatus has the same function and advantage as the preceding apparatus. Compared to the preceding configuration in which the overlaid image data is read out of the frame memory and displayed, in this configuration the extraction image is superimposed as the image data is being read out of the frame memory. Therefore, the time taken from the initial overlay command to the display of the overlaid image is shorter.

In another preferred arrangement, the synthesizer section comprises a data selector that selects either one of the second image data and the extraction image data, pixel by pixel, to produce the overlaid image data.

With this configuration, since the data selector selects either one of the second image data and the extraction image data, an extraction image can be superimposed on the original image by substituting extraction image data for part of the original image data.

It is preferable for the synthesizer section to be equipped with a multiplier section that multiplies the second image data and the extraction image data by respective coefficients on a pixel by pixel basis; and an adder section that adds the multiplied second image data and the extraction image data on a pixel by pixel basis.

With this configuration, the coefficients can be used to adjust the density ratio between the embellishment image and the original image.

In another preferred configuration, the synthesizer section comprises a coefficient setting section that controls the coefficients in the multiplier section to change a synthesis ratio between the second image data and the extraction image data, thereby adjusting a degree of transparency of the extraction image superimposed on the original image.

Doing this enables the synthesis ratio between the image data and the extraction image data to be altered by controlling the coefficients of the multiplier section, making it possible an overlay image in which the portion overlaid by an extraction image is transmitted.

In the above projection display apparatus, also, it is preferable that the coefficient setting section changes the coefficients in the multiplier section with time to change the synthesis ratio between the second image data and the extraction image data, thereby changing the degree of transparency of the extraction image superimposed on the original image with time.

Doing this makes it possible to change with time the degree of transparency of the portion on which an extraction image is overlaid by changing the coefficients of the multiplier section with time.

A projection display apparatus according to a second aspect of the invention comprises: a frame memory for storing image data representing an image to be displayed; a image display signal generator for generating image display signals based on the image data stored in the frame memory; a electro-optical device for emitting light to form images responsive to the image display signals; a projection optical system for projecting light emitted by the electro-optical device; an image extraction section that extracts at least a portion of an extraction target image selected arbitrarily from among images given externally as an extraction image; an ex traction image memory for storing extraction image data representing the extraction image; and a specific image display control section that in a specific display condition displays a specific image represented by specific image data including the extraction image data stored in the extraction image memory.

With this configuration, at least a part of a selected target image can be acquired as the extraction image. In a specific display condition, this makes it possible to display specific image that include arbitrarily extracted image, in place of image given to the projection display apparatus. Thus, desired specific image can be displayed even when specific images are not being supplied from an external source.

In another preferred configuration, the image extraction section implements the steps of: displaying an extraction image setting screen for setting image extraction conditions comprising at least an extraction area and an extraction magnification factor; displaying an extraction area specifying image used in setting the extraction area on the extraction target image; when the extraction area is set with the extraction area specifying image, writing into the frame memory selected extraction image data representing a selected extraction image corresponding to the set extraction area; when a display magnification factor is set, enlarging or reducing the selected extraction image data based on the magnification factor and writing the enlarged or reduced selected extraction image data into the frame memory; and when a desired display magnification factor is determined, storing the selected extraction image data enlarged or reduced based on the desired display magnification factor in the extraction image memory.

The extraction image setting screen makes it easier to set the target extraction image area. Also, before a magnification factor is determined, it can be checked by displaying the selected extraction image corresponding to the set extraction area at the selected magnification factor concerned.

In another preferred arrangement, the image extraction section displays a predetermined extraction frame as the extraction area specifying image, the predetermined extraction frame having a first black outline, a second black outline inside the first black outline and a white area between the first and second black outlines.

This facilitates setting the extraction area by making it easy to distinguish the extraction area on the extraction target image. Whatever the color of the extraction target image is, black outlines or white image frame can be displayed clearly.

In another preferred arrangement, the extraction image memory stores a plurality of extraction image data representing a plurality of extraction images; and the specific image display control section displays a specific image that include at least one extraction image selected from among the plurality of extraction images in the specific display condition.

A specific image display control section can be used that selects at least two of the extraction images from among the plurality of extraction images and displays the selected images in order.

The ability to choose from among a plurality of extraction images means that more effective specific image can be used.

In another preferred configuration, the projection display apparatus includes an operating condition judging section that judges if the projection display apparatus is in a specific operating condition, wherein the specific image display control section displays the specific image when the specific operating condition is detected by the operating condition judging section.

This configuration can automatically determine when the projection display apparatus is in a specific operating condition, and display specific image that includes extraction image extracted by the image extraction section.

Specifically, the operating condition judging section is configured to detect as the specific operating condition at least one state selected from a state in which no image signal is being given to the projection display apparatus, and another state in which the projection display apparatus is within a prescribed period after startup.

In each of these states, in which the projection display apparatus cannot perform its normal display function, specific image that include extraction image extracted by the image extraction section can be automatically displayed.

A projection display apparatus according to a third aspect of the invention comprises: a frame memory for storing image data representing an image to be displayed; a image display signal generator for generating image display signals based on the image data stored in the frame memory; a electro-optical device for emitting light to form images responsive to the image display signals; a projection optical system for projecting light emitted by the electro-optical device; an operating condition judging section that judges if the projection display apparatus is in a specific operating condition; and a specific image display control section that displays the specific image represented by the specific image data when the operating condition judging section detects the specific display condition.

This configuration can automatically determine when the projection display apparatus is in a specific operating condition, and display specific images at such times.

For this, preferably the operating condition judging section detects as the specific operating condition at least one state selected from a state in which no image signal is being given, and a state in which the projection display apparatus is within a prescribed period after startup.

As described above, in each of these states in which the projection display apparatus cannot perform its normal display functions, specific image that include extraction image extracted by the image extraction section can be automatically displayed.

An image display apparatus according to a fourth aspect of the invention comprises: a frame memory for storing image data representing an image to be displayed; a image display signal generator for generating image display signals based on the image data stored in the frame memory; a electro-optical device for emitting light to form images responsive to the image display signals; an image extraction section that extracts at least a portion of an extraction target image selected arbitrarily from among images given externally as an extraction image; an extraction image memory for storing extraction image data representing the extraction image; and a specific image display control section that in a specific display condition displays the specific images represented by a specific image data including the extraction image data stored in the extraction image memory.

This image display apparatus has the same function and advantage as the projection display apparatus according to the fourth aspect. In a specific display condition selected by a user, the image display apparatus can display specific image that include arbitrarily extracted image in place of image given to the image display apparatus.

An image display apparatus according to a fifth aspect of the invention comprises: a frame memory for storing image data representing an image to be displayed; a image display signal generator for generating image display signals based on the image data stored in the frame memory; a electro-optical device for emitting light to form images responsive to the image display signals; an operating condition judging section that judges if the projection display apparatus is in a specific operating condition; and a specific image display control section that displays the specific image represented by the specific image data when the operating condition judging section detects the specific display condition.

This image display apparatus has the same function and advantage as the projection display apparatus according to the third aspect. It can automatically detect when the image display apparatus is in a specific display condition, and display specific images.

In accordance with a sixth aspect of the invention, a method of displaying images using a projection display apparatus having a light modulation unit to display an image based on image data given to the projection display apparatus by projecting the image on a screen, which comprises the steps of: extracting at least a portion of given first image data as an extraction image; preparing extraction image data representing the extraction image; generating overlaid image data by superimposing the extraction image on an original image represented by given second image data; driving light modulation unit responsive to the overlaid image data pixel by pixel basis; and projecting onto a screen overlaid images obtained by the light modulation unit.

This display method has the same function and advantage as the projection display apparatus according to the first aspect, enabling simultaneous display of related portions of multiple pages of images.

A display method according to a seventh aspect of the invention comprises the steps of: extracting at least a portion of a given extraction target image as an extraction image; preparing extraction image data representing the extraction image; and in a specific display condition, displaying a specific image represented by specific image data including the extraction image data.

This display method has the same function and advantage as the projection display apparatus according to the second aspect, enabling a specific image to be displayed even when the specific image is not being supplied from an external source.

A display method according to an eighth aspect of the invention comprises the steps of: judging if the projection display apparatus is in a specific operating condition; when it is judged that there is a specific operating condition, storing specific image data to a frame memory to display a specific image represented by specific image data.

This display method provides the same function and advantage as the projection display apparatus according to the third aspect, and is able to automatically determine when the projection display apparatus is in a specific operating condition, and display specific images at such times.

At least part of the functions of the above-described method steps and components of the invention can be implemented by a computer program recorded on computer-readable recording media such as floppy disks, CD-ROMs, opto-magnetic disks, punched cards, bar codes and other such printed symbols, internal storage device (including RAM and ROM) and external storage device.

BRIEF DESCRIPTION OF THE DRAWINGS

FIG. 29 is a block diagram showing the configuration of the operating condition judging section 226.

FIGS. 30(a)–(e) are time charts of the operation of the operating condition judging section 226.

BEST MODES OF CARRYING OUT THE INVENTION

A. First Embodiment

Figure 1:
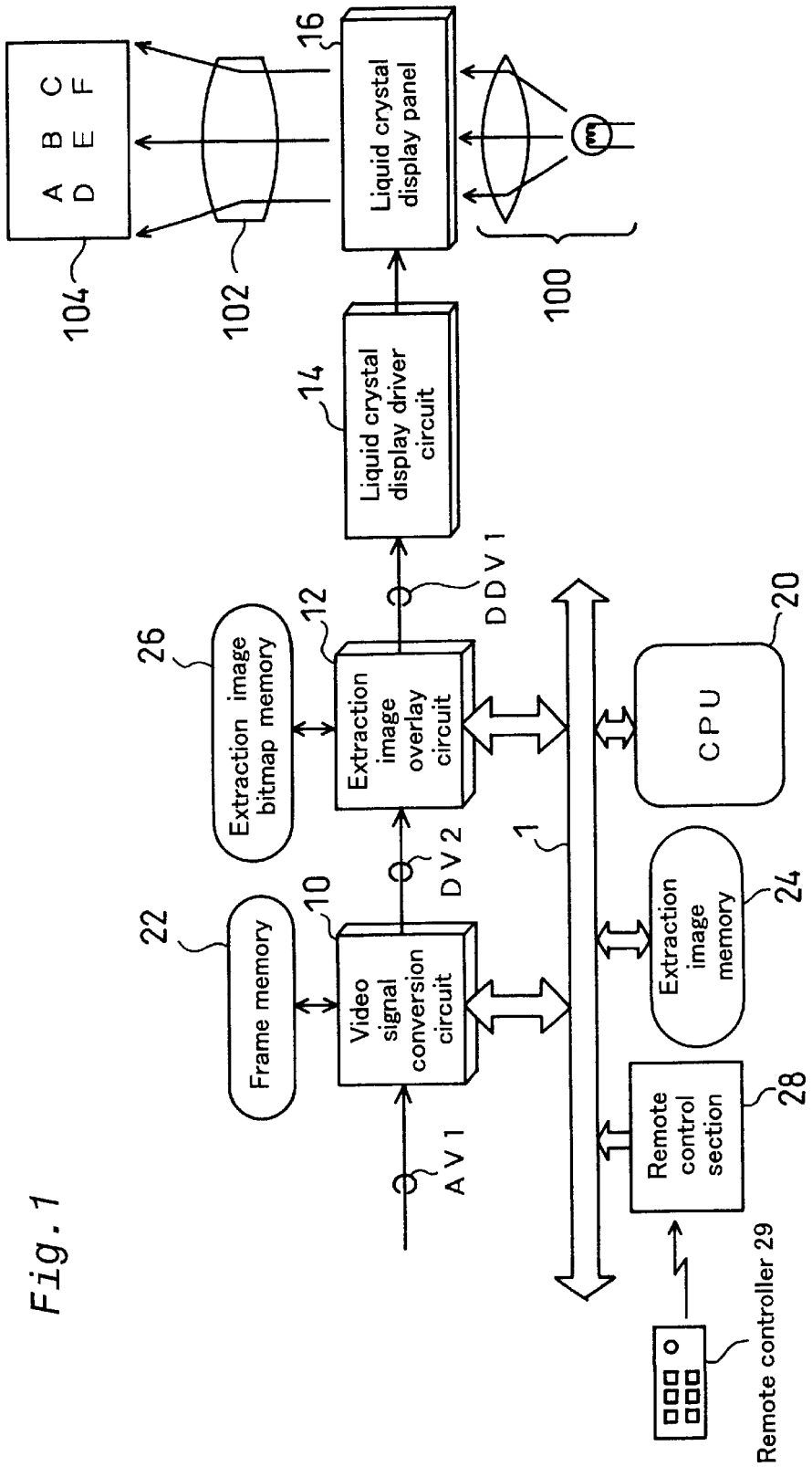
FIG. 1 is a block diagram for schematically illustrating a first embodiment of the general configuration of a projection display apparatus according to a first aspect of the invention.

Some modes for carrying out the present invention are described below as preferred embodiments. FIG. 1 is a block diagram for schematically illustrating a first embodiment of the general configuration of a projection display apparatus according to a first aspect of the invention. The projection display apparatus includes a video signal conversion circuit 10, an extraction image overlay circuit 12, a liquid crystal display driver circuit 14, a liquid crystal display panel 16, a frame memory 22, an extraction image memory 24, an extraction image bitmap memory 26, a remote control section 28, a CPU 20, an illumination optical system 100 and a projection optical system 102. The video signal conversion circuit 10, extraction image overlay circuit 12, extraction image memory 24, remote control section 28 and CPU 20 are connected to via a bus 1. The liquid crystal display driver circuit 14 is also connected to the bus 1, but this is not shown in FIG. 1. The liquid crystal display panel 16 is uniformly illuminated by the illumination optical system 100, and images displayed on the liquid crystal display panel 16 are projected onto the projection screen 104 by the projection optical system 102. The optical systems 100 and 102 are shown in a simplified fashion.

The video signal conversion circuit 10 is used to perform analog-digital conversion of analog video signals AV1, write the converted image data into the frame memory 22 and retrieve image data from the frame memory 22. The analog video signal AV1 can be an RGB signal S1 carrying a computer screen image, or a composite image signal S2 from a video recorder, TV or the like.

Figure 2:
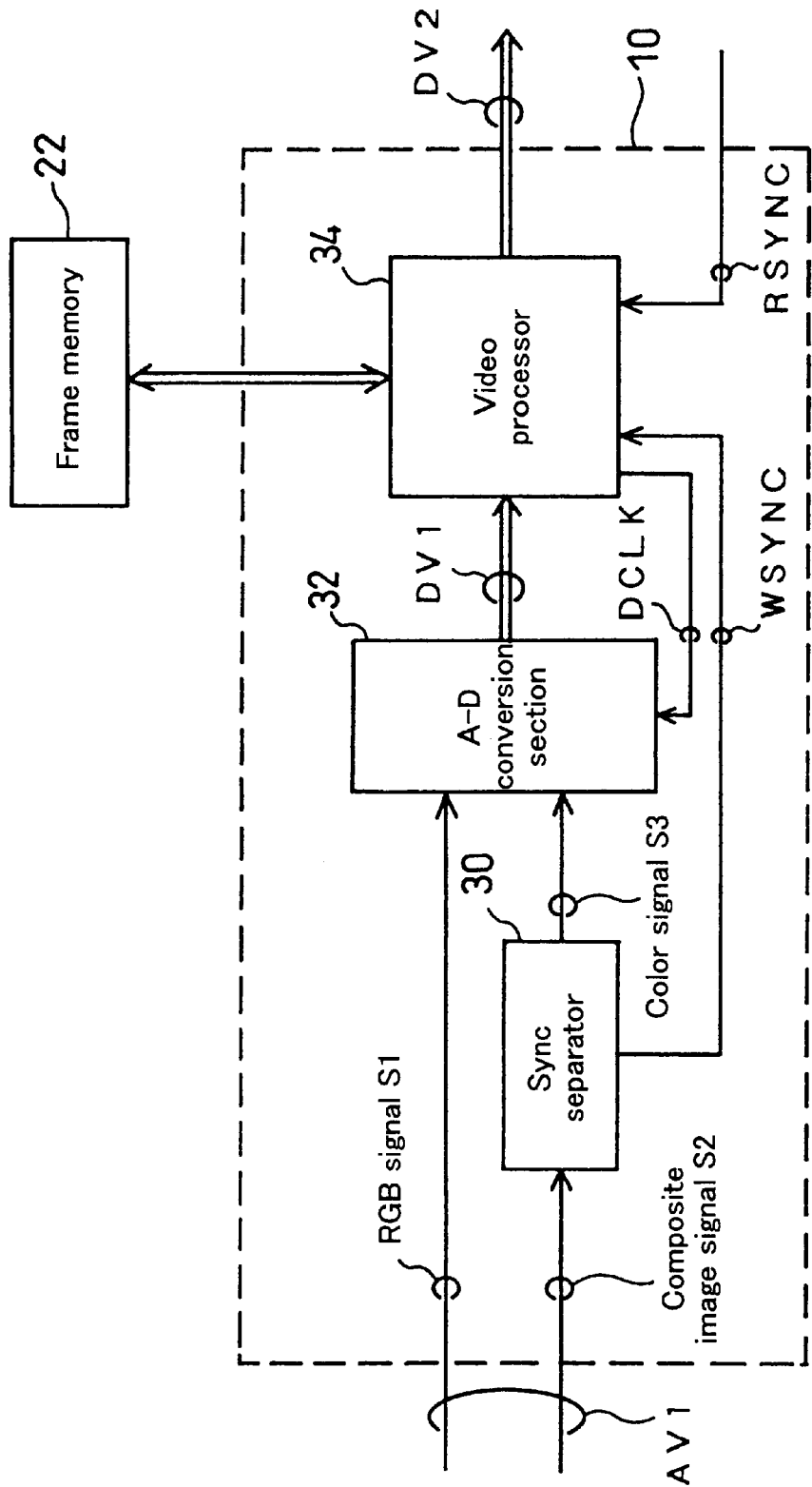
FIG. 2 is a block diagram for schematically illustrating the configuration of a video signal conversion circuit 10.

FIG. 2 is a block diagram for schematically illustrating the configuration of the video signal conversion circuit 10. The video signal conversion circuit 10 includes a sync separator 30, an A–D conversion section 32 and a video processor 34.

When the analog video signal AV1 is a composite image signal S2, the sync separator 230 separates the signal S2 into a sync signal SYNC and a component image signal (analog image signals not including a sync signal) S3. The component image signal S3 is comprised of three color signals representing the red, green and blue images. If the analog video signal AV1 that is received is an RGB signal S1, there is no need to use the sync separator 230 since there is a separate sync signal input.

The A–D conversion section 232 contains multiple A–D converters for converting RGB signal S1 or component image signal (RGB signal) S3 output by the sync separator 230 to image data DV1 for each color signal. The conversion timing of the A–D converters is controlled by a dot clock DCLK generated in the video processor 234, using the sync signal WSYNC.

The video processor 34 is a microprocessor that performs various image processing functions such as controlling the input and output of image data to and from the frame memory 22. Image data DV1 from the A–D conversion section 32 is stored in the frame memory 22 until required.

Figure 3:
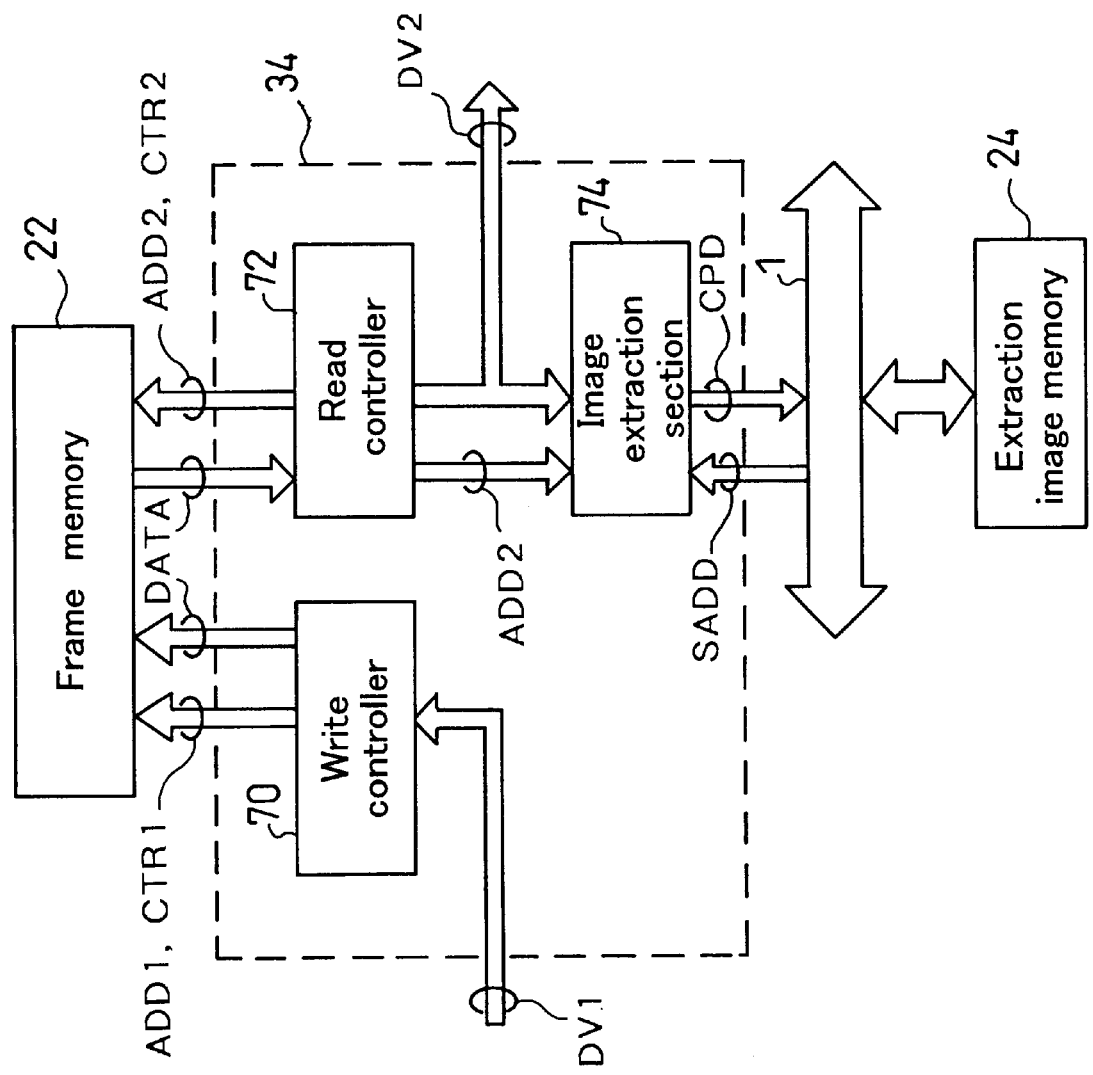
FIG. 3 is a block diagram showing the configuration of the video processor 34.

FIG. 3 is a block diagram showing the configuration of the video processor 34. The video processor 34 includes a write controller 70, a read controller 72 and an image extraction section 74.

When image data is written to, or read from, the frame memory 22, the write controller 70 and read controller 72 generate addresses ADD1, ADD2 and control signals CTR1, CTR2 and supply them to the frame memory 22. Thus, the image data is written to the frame memory 22 in accordance with address ADD1 and control signal CTR1 generated by the write controller 70, and read out of the frame memory 22 in accordance with address ADD2 and control signal CTR2 generated by the read controller 72. These addresses and control signals are based on sync signals WSYNC and RSYNC.

The writing of image data to the frame memory 22 is synchronized by the sync signal WSYNC. The retrieval of image data from the frame memory 22 and the downstream processing of the image data DV2 output by the video processor 34 are synchronized by the sync signal RSYNC output by the liquid crystal display driver circuit 14 (FIG. 1) explained below. The first sync signal WSYNC and the second sync signal RSYNC are not mutually synchronized. However, sync signals WSYNC and RSYNC can be used synchronized.

When image data that has been written into the frame memory 22 is read out, the image extraction section 74 (FIG. 3) extracts a specified portion of the image data. The image extraction section 74 compresses the extracted image data and writes it to the extraction image memory 24 via the bus 1. The extracted image data does not have to be compressed by the image extraction section 74. Also, the data can be reduced instead of compressed. The operation of specifying the portion of the image data to be extracted can be done using a remote controller 29. When the extraction portion has been specified by the remote controller 29, the CPU 20 outputs an extraction address SADD corresponding to the specified extraction portion. Based on the extraction address SADD and address ADD2 that is output from the read controller 72, the image extraction section 74 extracts the pixel data of the extraction portion. By doing this, only pixel data corresponding to specified portion can be extracted.

The extraction image memory 24 shown in FIG. 1 is used to store the extraction image data extracted by the image extraction section 74 of the video processor 34 (FIG. 3). In this embodiment, the extraction image data is stored in compressed form in the extraction image memory 24 as compressed extraction image data CPD. The data CPD is expanded into extraction image bitmap data BMD1, which is stored in the extraction image bitmap memory 26. The extracted image data may also be stored in uncompressed form in the memory 26, in which case the extraction image memory 24 is unnecessary.

Figure 4:
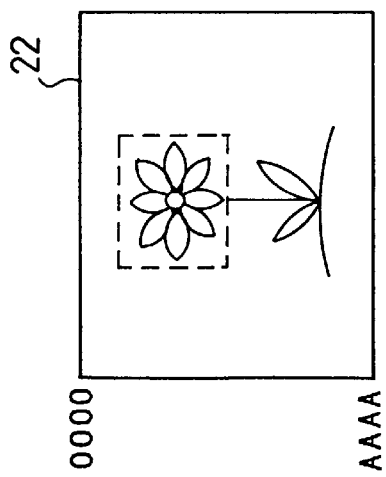
FIGS. 4(a)–(d) are diagrams for explaining the frame memory 22, extraction image memory 24 and extraction image bitmap memory 26 used in this embodiment.
Figure 4:
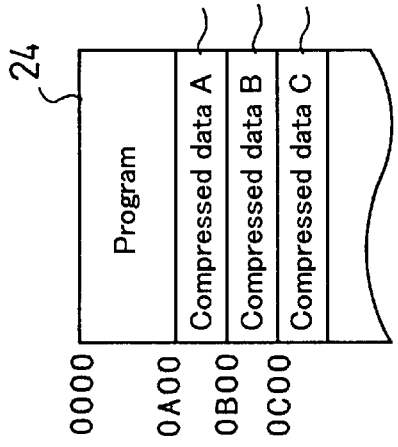
Figure 4:
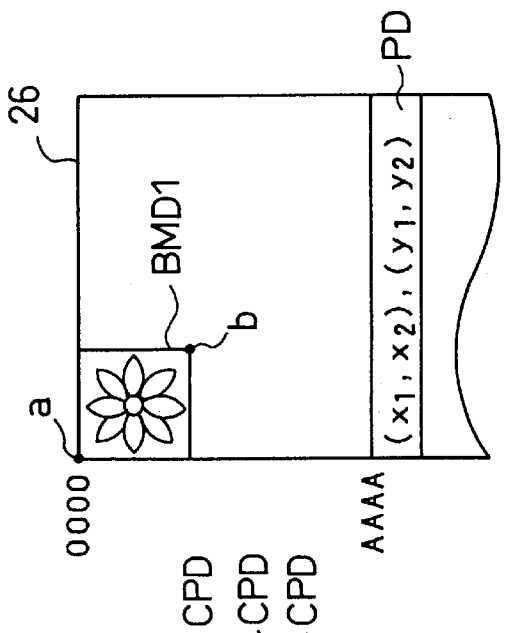
Figure 4:
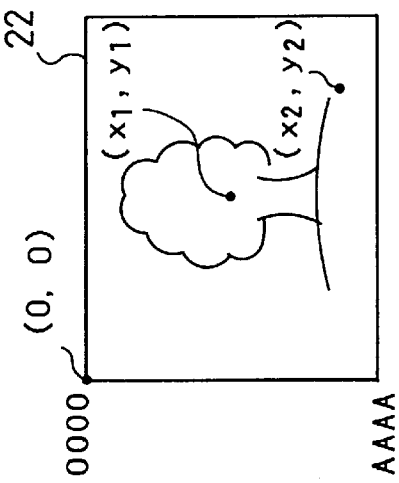

FIGS. 4(a)–(d) are diagrams for explaining the frame memory 22, extraction image memory 24 and extraction image bitmap memory 26 used in this embodiment. FIGS. 4(a) and (d) show the memory space in the frame memory 22, FIG. 4(b) shows the memory space in the extraction image memory 24, and FIG. 4(c) shows the memory space in the extraction image bitmap memory 26.

With reference to FIG. 4(a), the frame memory 22 contains one frame of the input image data (a picture of a flower) in a bitmap format. The broken line shows the extraction portion, which is defined by the user, extracted and compressed by the image extraction section 74, and stored in the extraction image memory 24 as compressed extraction image data CPD.

As shown in FIG. 4(b), the extraction image memory 24 contains multiple types of compressed extraction image data CPD and a program for expanding the compressed extraction image data CPD into a bitmap. The program is stored in the memory 24 starting at memory address 0000. Compressed data A, B and C are stored at starting addresses 0A00, 0B00 and 0C00, respectively.

The extraction image bitmap memory 26 shown in FIG. 4(c) is used to store extraction image bitmap data BMD1 expanded by the program in the extraction image memory 24, and coordinate data PD showing the overlay position and extent of the extracted image on the original image data. The extraction image bitmap data BMD1 (FIG. 4(c)) is expanded starting from address 0000 of the extraction image bitmap memory 26. The coordinate data PD is stored starting at address AAAA, and includes two point coordinates (x1, y1), (x2, y2). The first coordinate (x1, y1) denotes the overlay position of the extracted image within the image data, and the two coordinates (x1, y1), (x2, y2) denote the overlay extent (meaning the size) of the extraction image.

The frame memory 22 shown in FIG. 4(d) contains image data (a picture of a tree) in a bitmap format. The extraction image of FIG. 4(c) is overlaid on above image. The coordinates (x1, y1), (x2, y2) shown in FIG. 4(d) are based on the address 0000 of the frame memory 22 being for coordinates (0, 0). The coordinates (x1, y1), (x2, y2) correspond to the coordinate data PD of FIG. 4(c), in which point a at the upper left of the extraction image bitmap data BMD1 corresponds to the coordinates (x1, y1), and point b at the lower right corresponds to the coordinates (x2, y2).

When a user selects one of the multiple extraction images prepared by extracting image data, it is expanded as extraction image bitmap data BMD1. A user can obtain the coordinate data PD by specifying an overlay position within the image data, or the position and extent of the overlay. If just an overlay position is specified, coordinates (x1, y1) are determined, and the coordinate data (x2, y2) is set based upon predetermined sizes set according to the type of extraction image concerned. The size is determined when the extraction image is extracted. When both position and extent of the overlay are specified, coordinates (x1, y1) are set according to the overlay position specified, and in accordance with the overlay extent (size) specified, coordinates (x2+Δx, y2+Δy) are substituted for (x2, y2). This enables the extraction image to be enlarged or reduced to any desired size. Although in this embodiment the extraction image bitmap data BMD1 and coordinate data PD are stored in the extraction image bitmap memory 26, they can instead be stored in the extraction image memory 24.

The extraction image overlay circuit 12 (FIG. 1) overlays input images and extraction images. Specifically, the extraction image overlay circuit 12 overlays image data DV2 output by the video signal conversion circuit 10 and extraction image bitmap data BMD1 expanded in the extraction image bitmap memory 26 (FIG. 4(c)).

Figure 5:
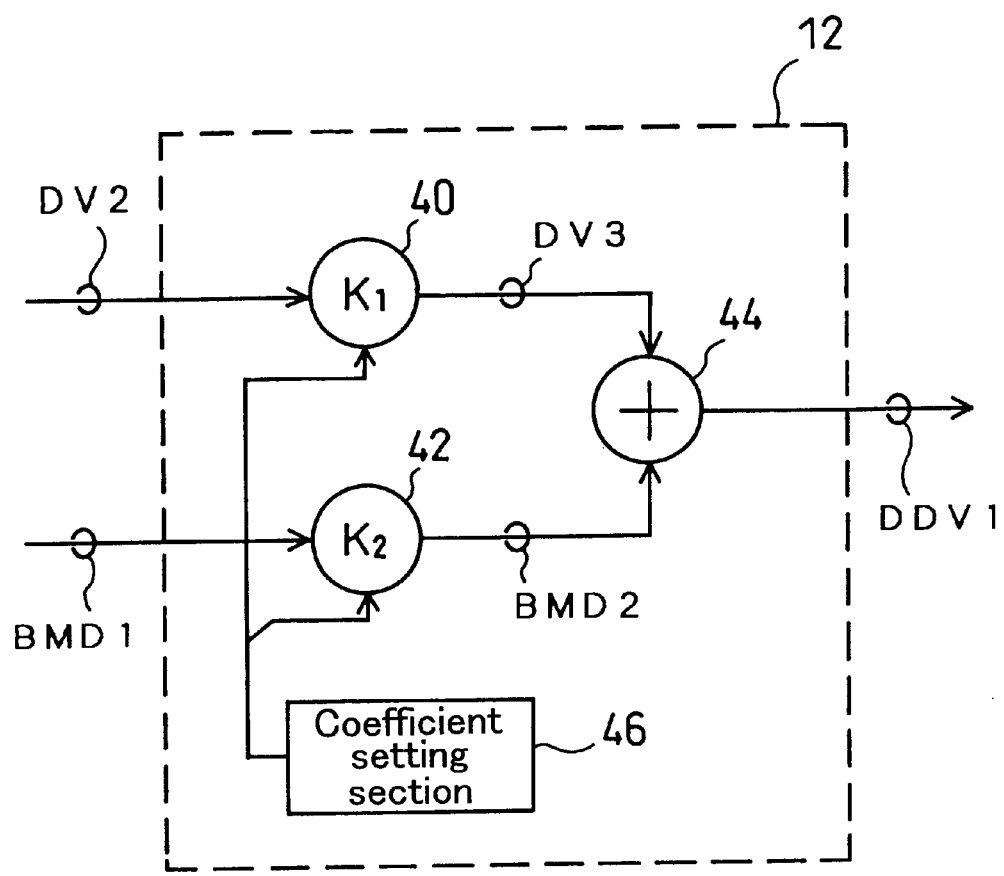
FIG. 5 is a block diagram for schematically illustrating the configuration of the extraction image overlay circuit 12.

FIG. 5 is a block diagram for schematically illustrating the configuration of the extraction image overlay circuit 12. The extraction image overlay circuit 12 includes two multipliers 40 and 42, an adder 44 and a coefficient setting section 46. The two multipliers 40 and 42 and the adder 44 constitute a configuration that is provided for each of the colors RGB. Image data DV2 output by the video processor 34 is input to the first multiplier 40, and the extraction image bitmap data BMD1 expanded in the extraction image bitmap memory 26 is input to the second multiplier 42.

The coefficient setting section 46 is used to set the coefficients k1 and k2 of the multipliers 40 and 42. Coefficients k1 and k2 can each be set to a value ranging from 0 to 1, and generally are set at a value that sums to 1. The coefficients k1 and k2 are controlled by the coefficient setting section 46 based on the coordinate data PD (FIG. 4(c)).

The multipliers 40 and 42 are used to multiply each pixel data of input image data by a constant factor. In the multiplier 40, the image data DV2 is converted to signals multiplied by k1. Similarly, extraction image bitmap data BMD1 is converted to signals multiplied by k2. The converted data output as image data DV3 and extraction image bitmap data BMD2 are input to the adder 44.

The function of the adder 44 is to add the pixel data of two input image signals. Thus, in the adder 44 the image data DV3 and the extraction image bitmap data BMD2 are added and output as overlay image data DDV1. The multipliers 40 and 42, adder 44 and coefficient setting section 46 correspond to the synthesizer section in the projection display apparatus according to the first aspect of this invention, The overlay image data DDV1 output by the extraction image overlay circuit 12 is supplied to the liquid crystal display driver circuit 14 (FIG. 1). The liquid crystal display driver circuit 14 displays on the liquid crystal display panel 16 the image with the extracted image overlay corresponding to the overlay image data DDV1. The image displayed on the liquid crystal display panel 16 is projected onto the screen 104 by the optical systems 100 and 102. More specifically, the light incident onto the liquid crystal display panel 16 by the illumination optical system 100 is modulated in accordance with image data supplied to the liquid crystal display panel 16, and the light exiting from the liquid crystal display panel 16 is projected onto the projection screen 104 by the projection optical system 102. The liquid crystal display panel 16 corresponds to the light modulation unit in the projection display apparatus according to the first invention.

The projection display apparatus is controlled by the remote control section 28 in accordance with commands from the remote controller 29. The remote control section 28 controls mainly processing related to the extraction images. In accordance with commands received from the remote controller 29, this includes specifying the portion of an image to be extracted, selecting the type of extraction image and controlling the overlay position and extent of the extraction images, and whether the extraction images are displayed or not.

Instead of hardware, the functions of the video signal conversion circuit 10, extraction image overlay circuit 12 and remote control section 28 can be realized by a computer program. The computer program for realizing the functions of these parts can be provided in a format recorded on a computer-readable recording medium such as floppy disk, CD-ROM or the like. The program is read off the recording medium by the computer (projection display apparatus) and transferred to an internal storage device or an external storage device. Alternatively, the computer program may be supplied from a program supply apparatus via a communication route. When realizing the computer functions, a computer program stored in an internal storage device is executed by the computer CPU (microprocessor). A computer program recorded on a recording medium can also be executed directly by the computer.

As used in this specification, "computer" includes hardware and an operating system, with the hardware being operated under the control of the operating system. If the hardware is operated by an application program having no need of an operating system, then the hardware itself will constitute the computer. The hardware comprises at least a microprocessor like a CPU and means for reading a program recorded on a recording medium. For this purpose, the computer program includes program code for realizing the function of each of the means described in the foregoing. Some of the functions can be implemented by the operating system instead of an application program.

The recording media in this invention include floppy disks, CD-ROM disks, opto-magnetic disks, IC cards, ROM cartridges, punched cards, bar codes and other such printed symbols, internal storage devices (including RAM and ROM) and external storage devices.

Figure 6A:
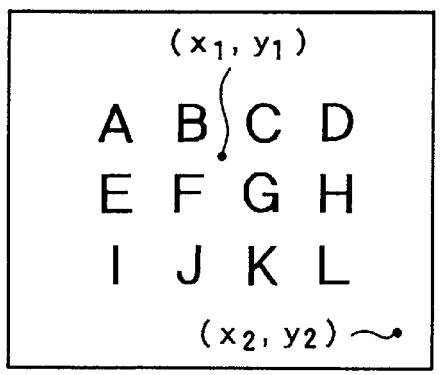
FIGS. 6(a)–(c) are diagrams for explaining the overlay operation with respect to image data stored in the frame memory 22 and extraction image bitmap data BMD1 stored in the extraction image bitmap memory 26.
Figure 6B:
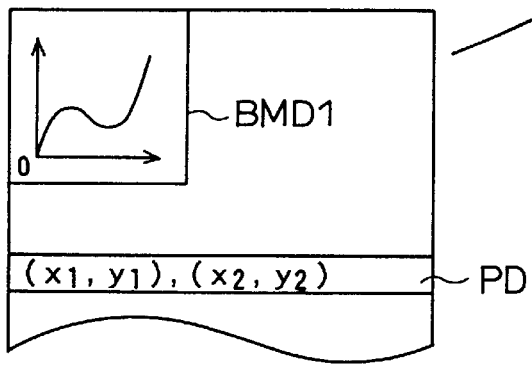
Figure 6C:
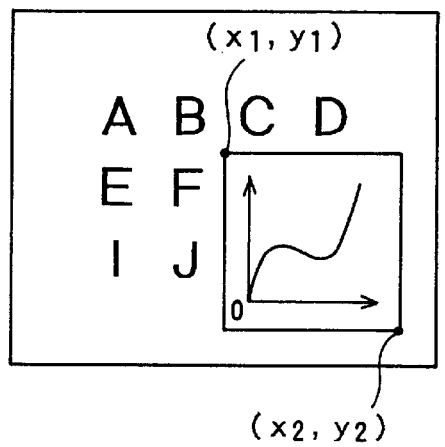

FIGS. 6(a)–(c) are diagrams for explaining the overlay operation with respect to image data stored in the frame memory 22 and extraction image bitmap data BMD1 stored in the extraction image bitmap memory 26. FIG. 6(a) shows the memory space of the frame memory 22, containing image data (text). FIG. 6(b) shows the memory space of the extraction image bitmap memory 26, containing extraction image bitmap data BMD1 (a graph) and coordinate data PD showing the position and extent of the overlay. The (x1, y1), (x2, y2) of this coordinate data PD in FIG. 6(b) correspond to the coordinates (x1, y1) and (x2, y2) in FIG. 6(a). FIG. 6(c) shows the overlay image data DDV1 consisting of the original image data overlaid with the extraction image bitmap data BMD1.

The overlaying of the extraction image bitmap data BMD1 on the image data is effected based on the coordinate data PD. In the extraction image overlay circuit 12 (FIG. 5), the stream of image data is input to the first multiplier 40 while the second multiplier 42 receives only the extraction image bitmap data BMD1 for the portion defined by the coordinates (x1, y1) and (x2, y2), which is the overlay portion. The timing of the input of the extraction image bitmap data BMD1 to the multiplier 42 is controlled by the CPU 20 based on the coordinate data PD. Simultaneously with the input of the extraction image bitmap data BMD1 to the multiplier 42, the coefficients k1 and k2 of the multipliers 40 and 42 are adjusted. When extraction image bitmap data BMD1 is not being input to the multiplier 42, the coefficients k1 and k2 of the multipliers 40 and 42 are set to (1, 0). When the extraction image bitmap data BMD1 is being input to the multiplier 42, the coefficients k1 and k2 are set to (0, 1). As a result, with respect to pixels not in the area defined by the coordinate data (x1, y1) and (x2, y2), the original image data (text) shown in FIG. 6(a) is output by the extraction image overlay circuit 12, while with respect to the pixels within the area defined by the coordinates (x1, y1), (x2, y2), the extraction image bitmap data BMD1 shown in FIG. 6(b) is output by the extraction image overlay circuit 12. In this way, the extraction image bitmap data BMD1 is superimposed on the image data, forming the overlay image data DDV1 representing the overlay image shown in FIG. 6(c).

Figure 7:
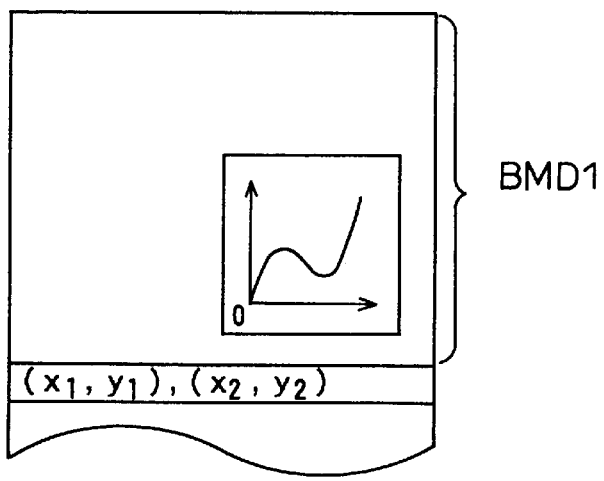
FIG. 7 is a diagram for explaining the extraction image bitmap data BMD1 expanded in the extraction image bitmap memory 26.

The extraction images can be generated in the extraction image bitmap memory 26 to correspond with the overlay position within the image data. FIG. 7 is a diagram for explaining the extraction image bitmap data BMD1 expanded in the extraction image bitmap memory 26. A portion of the extraction image bitmap memory 26 corresponding to one frame of image data is allocated for developing the extraction image bitmap data BMD1, and the extraction image is expanded at the location defined by the coordinates (x1, y1), (x2, y2). When the expansion takes place, as shown in FIG. 7, pixel data of the image data and the extraction image bitmap data BMD1 corresponding to the same position in the image are input simultaneously to the respective multipliers 40 and 42. At this time, for areas outside the area defined by the coordinate data PD coordinates (x1, y1) and (x2, y2), the coefficients (k1, k2) are set to (1, 0), while inside the area of the coordinates (x1, y1) and (x2, y2), the coefficients (k1, k2) are set to (0, 1). In this way, the original image data can be overlaid with the extraction image bitmap data BMD1, producing the overlay image data DDV1 representing the extraction image of FIG. 6(c).

As described above, when an extraction image is expanded as shown in FIG. 7, one frame of memory capacity is required as the memory area for the extraction image bitmap data BMD1, but when it is expanded as shown in FIG. 6(b), a memory capacity that is around the same size as the bitmap expanded extraction image is sufficient, so there is the advantage that the memory capacity can be small.

Figure 8A:
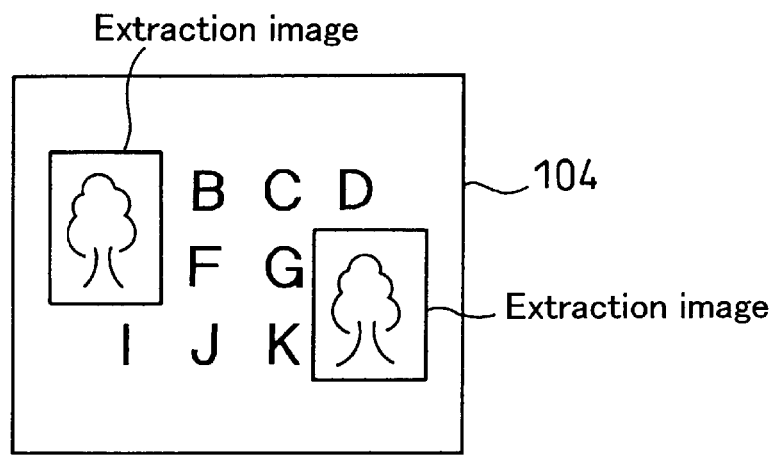
FIGS. 8(a)–(c) are diagrams for explaining examples of displays on a projection screen 104 of images input from a personal computer on which extraction images have been superimposed.
Figure 8B:
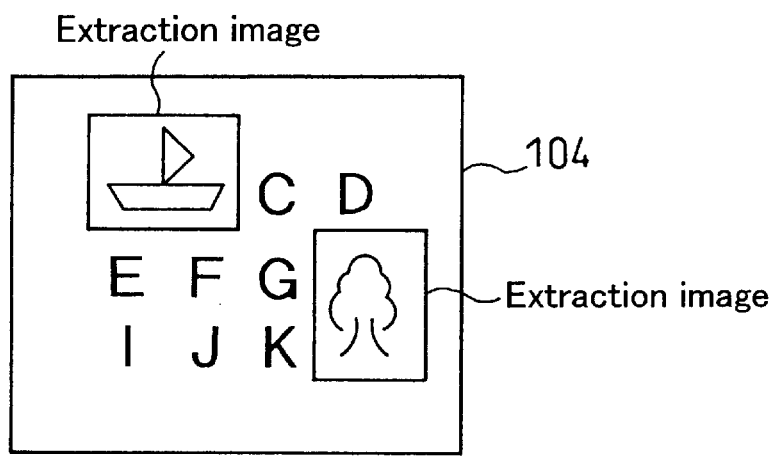
Figure 8C:
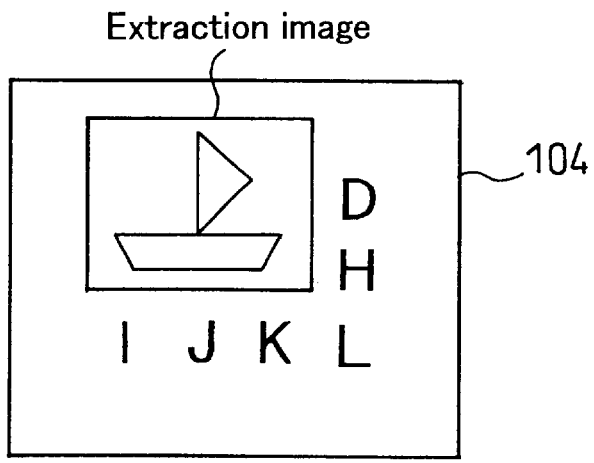

FIGS. 8(a)–(c) are diagrams for explaining examples of displays on a projection screen 104 of images input from a personal computer on which extraction images have been superimposed. FIG. 8(a) shows input image (text) overlaid with two extraction images (pictures of tree). FIG. 8(b) shows input image (text) overlaid with-two types of extraction images (pictures of a boat and a tree). FIG. 8(c) shows the input image (text) overlaid with enlarged extraction image (picture of a boat) shown in FIG. 8(b).

The extraction images shown in FIGS. 8(a) and (b) are overlaid by specifying the overlay position within the projection image. In this case, the coordinate data PD comprises coordinates (x1, y1) showing the specified position, and coordinates (x2, y2) defined by the predetermined size of extraction image. The extraction image shown in FIG. 8(c) is overlaid by specifying the overlay position and extent within the projection image. In this case, the coordinate data PD comprises the preset coordinates (x1, y1) and the coordinates (x2, y2) corresponding to the specified size.

Also, since the extraction image bitmap data BMD1 includes the coordinate data PD indicating the overlay position, an extraction image can be displayed at any point that is specified, using the remote controller 29. The extraction image bitmap data BMD1 and the coordinate data PD are being continually refreshed in sync with the sync signal RSYNC, so the remote controller 29 can be used to move an extraction image to any point within the projection image, on a realtime basis. Moreover, multiple extraction images can be displayed, as shown in FIG. 8(b). A command issued by the remote controller 29 and received by the remote control section 28 can be used to execute the program in the extraction image memory 24 to generate the extraction image bitmap data BMD1.

The shape of the extraction image extracted by the image extraction section 74 is not limited to the rectangles shown in FIGS. 8(a)–(c). Any shape specified using the remote controller 29 can be extracted from an original image by the image extraction section 74, so the extraction image can be oval, round, star-shaped, or a shape defined by straight lines.

Figure 9:
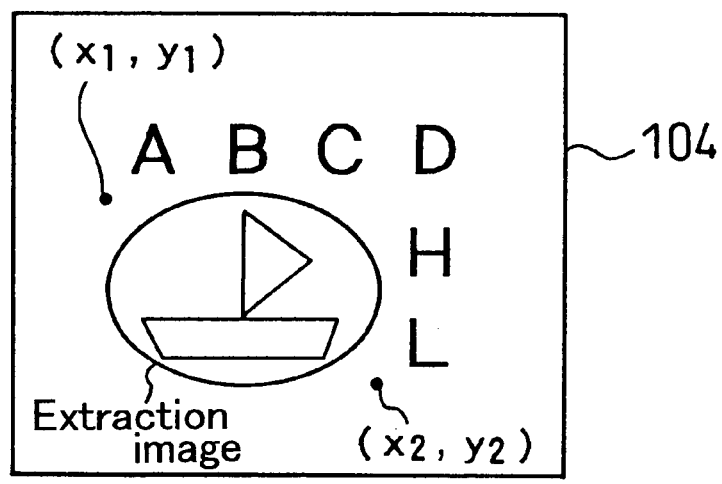
FIG. 9 is another diagram for explaining the display on a projection screen 104 of an image input from a personal computer on which an extraction image has been superimposed.

FIG. 9 is another diagram for explaining the display on a projection screen 104 of an image input from a personal computer on which an extraction image has been superimposed. As shown in FIG. 9, an oval extraction image (picture of boat) is superimposed on the original image (text).

In this embodiment, the coordinate data PD includes two point coordinates defining the extraction image overlay position and extent. In the case of FIG. 9, the data is processed so that within the area specified by the coordinates, the portion where there is no extraction image is not overlaid.

Figure 10:
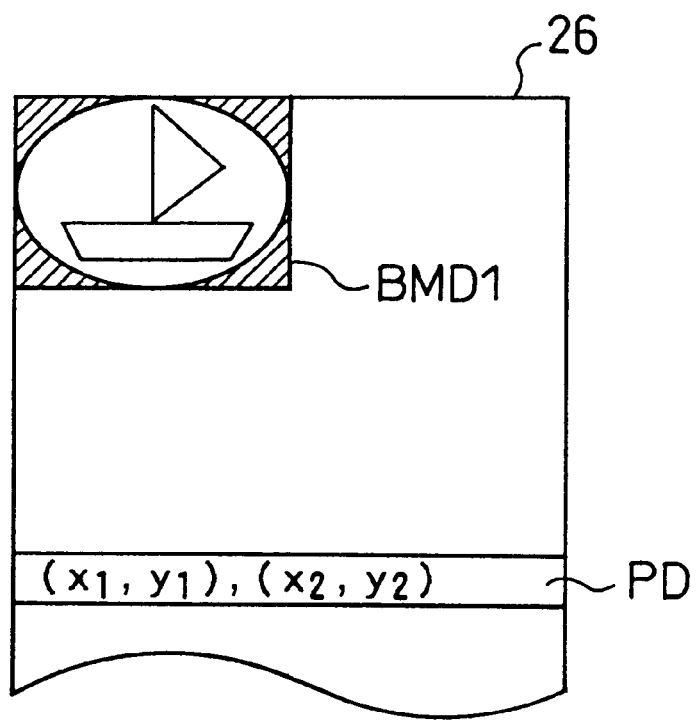
FIG. 10 is a diagram for explaining the extraction image bitmap memory 26 when the extraction image of FIG. 9 is expanded.

FIG. 10 is a diagram for explaining the extraction image bitmap memory 26 when the extraction image of FIG. 9 is expanded. In the case of this extraction image bitmap data BMD1, the shaded portion outside the oval is not to be overlaid on the input image, so the pixels of that portion are comprised using specified pixel data. The pixels where there is no extraction image are comprised of specified pixel data, for example, all the bits of the RGB pixel data can be set to 0. In this case, when the extraction image bitmap data BMD1 is input to the coefficient setting section 46, the coefficient setting section 46 checks the data to determine whether the pixels contain an extraction image. The system can be set so that when the input image data relates to pixels where there is no extraction image, the coefficients (k1, k2) of the multipliers 40 and 42 are changed to (1, 0). This makes it possible to ensure that only that portion of the extraction image bitmap data BMD1 that contains an extraction image will be overlaid on the original image data. It goes without saying that the coordinate data PD can be comprised of numerous point coordinates around the portion where the extraction image exists, in which case just the said portion containing the extraction image could be overlaid, based just on the coordinate data PD.

In the examples shown in FIGS. 8(a)–(c) and 9, the extraction images appear as filled-in images on the original input image. This overlay effect is obtained by the extraction bitmap data being substituted for part of the original image. In the extraction image overlay circuit 12 (FIG. 5) the multiplier coefficients (k1, k2) are set at (1, 0) for those portions where no extraction image is overlaid, while the coefficients (k1, k2) are set at (0, 1) for portions where an extraction image is overlaid.

Transparent extractions can be applied by changing k1 and k2. Setting both k1 and k2 to ½, for example, would produce a transparent effect in the portion where the extraction image is overlaid on the input image.

Figure 11A:
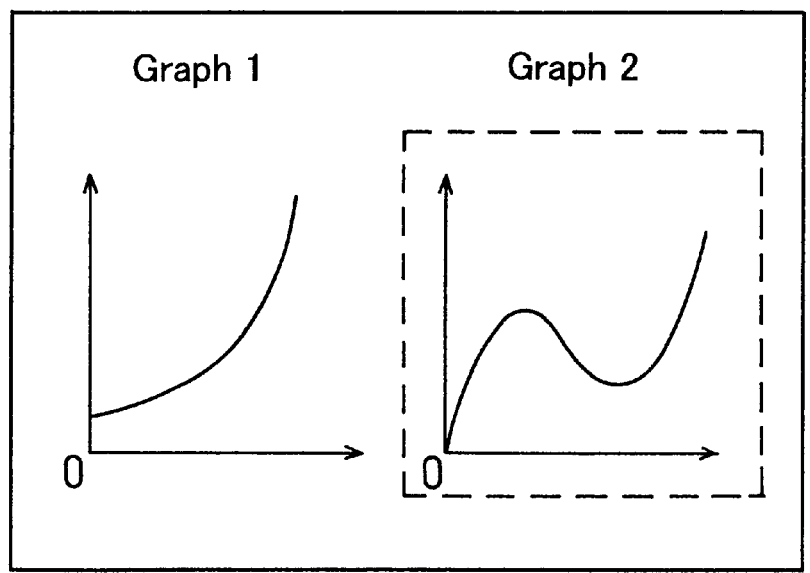
FIGS. 11(a) and 11(b) are diagrams for explaining projected images overlaid with transparent extraction images.
Figure 11B:
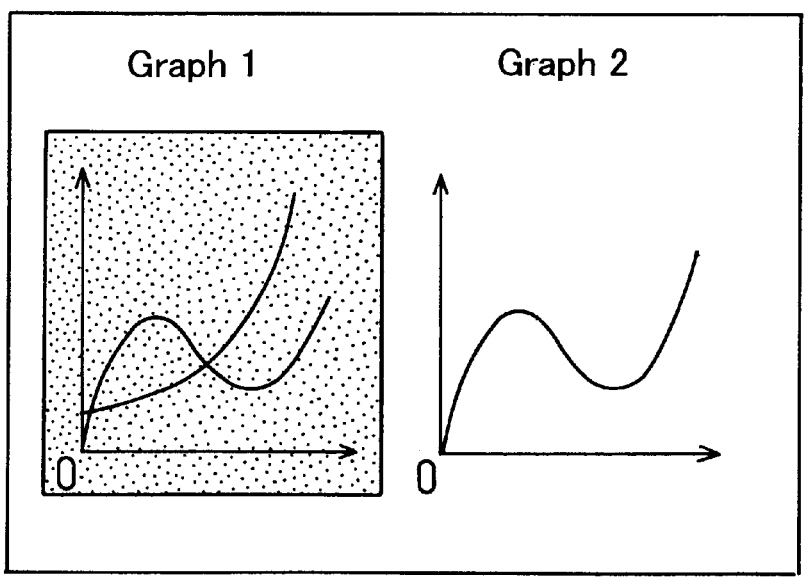

FIGS. 11(a) and 11(b) are diagrams for explaining projected images overlaid with transparent extracted images. FIG. 11(a) shows images (graphs 1 and 2) input from a computer. The broken line (graph 2) denotes the area specified as the cutout portion. In FIG. 11(b), the graph 2 portion of FIG. 11(a) has been extracted and overlaid on graph 1, which can be seen through graph 2. This shows the type of transparent overlay effect that can be achieved by setting the coefficients k1, k2 of the multipliers 40 and 42 in the extraction image overlay circuit (FIG. 5) to ½.

The overlay images shown in FIGS. 8(a)–(c), 9 and 11(a),(b) were obtained using the multiplier coefficients k1, k2 set at a fixed value such as 0, 1 and ½. However, k1 and k2 values can be used that change with time. For example, for portions where an extraction image is overlaid, the coefficients (k1, k2) can start at (0, 1) and, as time passes, can be gradually changed thus: (0.1, 0.9), (0.2, 0.8) . . . (1, 0). As a result, the extraction image overlay would start out looking solid, then would gradually become transparent and finally vanish. Such overlay effects can be obtained by changing the coefficients K1 and K2 with time. The coefficients are adjusted by the coefficient setting section 46 based on commands from the CPU 20.

The extraction image overlay circuit 12 and frame memory 22 of this embodiment correspond to the image overlay section according to the first aspect of this invention. Similarly, the extraction image memory 24 and extraction image bitmap memory 26 correspond to the extraction image memory of the first aspect of the invention. One of the memories 24 and 26 can be omitted.

B. Second Embodiment

Figure 12:
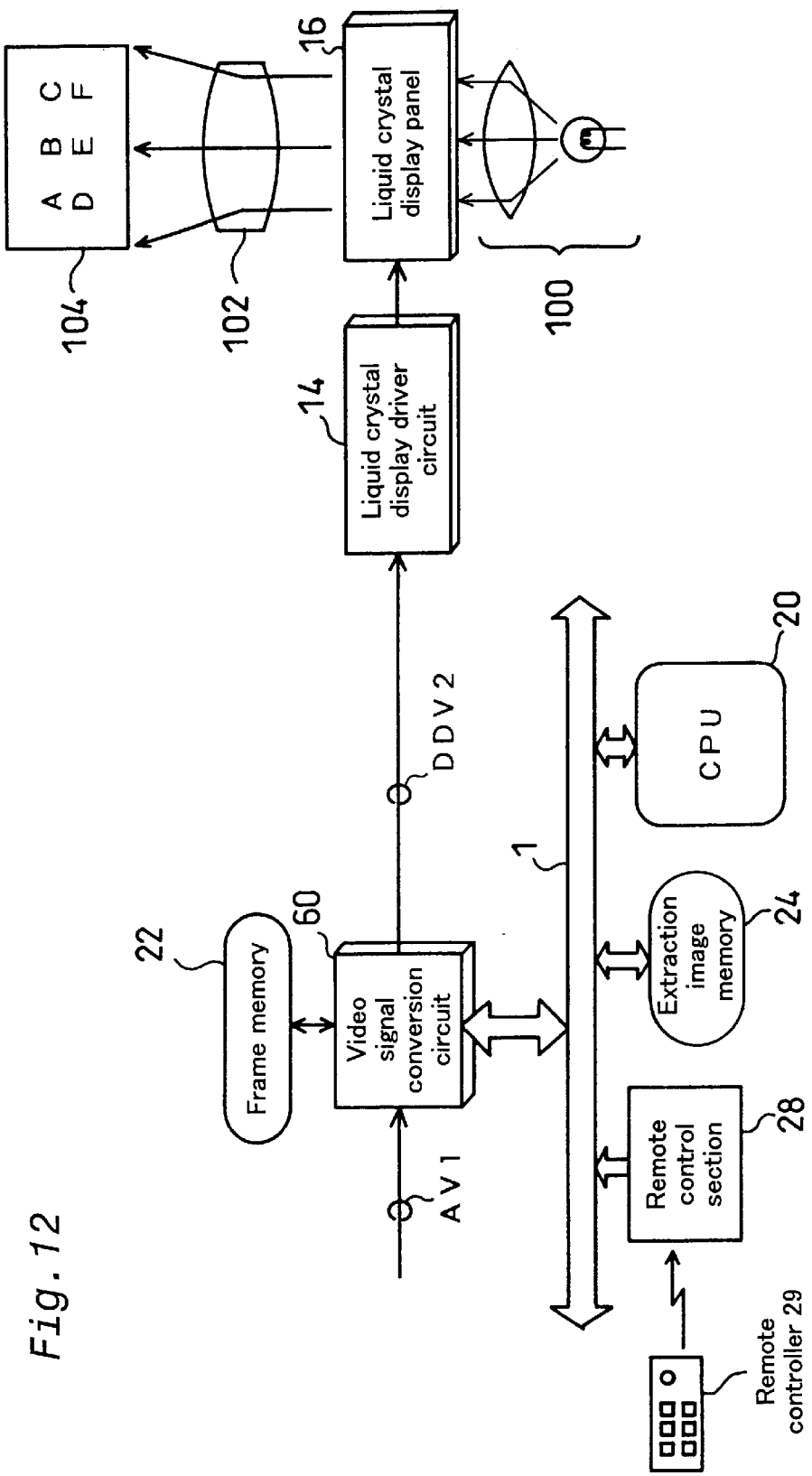
FIG. 12 is a block diagram for schematically illustrating the general configuration of a second embodiment of the projection display apparatus according to a first aspect of the invention.

FIG. 12 is a block diagram for schematically illustrating the general configuration of a second embodiment of the projection display apparatus according to the first aspect of the invention. The projection display apparatus includes a video signal conversion circuit 60, a liquid crystal display driver circuit 14, a liquid crystal display panel 16, a frame memory 22, an extraction image memory 24, a remote control section 28, a CPU 20, an illumination optical system 100 and a projection optical system 102. The video signal conversion circuit 60, extraction image memory 24, remote control section 28 and CPU 20 are connected via a bus 1. The liquid crystal display driver circuit 14 is also connected to the bus 1, but the connection is not shown in FIG. 12.

The projection display apparatus of this second embodiment does not have the extraction image overlay circuit 12 or the extraction image bitmap memory 26 possessed by the first embodiment. In this embodiment, the video signal conversion circuit 60 is used to overlay extraction images on the original image. Extraction image bitmap data BMD1 is stored in the extraction image memory 24. Thus, the video signal conversion circuit 60 and frame memory 22 correspond to the image overlay section of the first aspect of the invention. In this embodiment, only the extraction image memory 24 corresponds to the extraction image memory of the first aspect of the invention.

Figure 13:
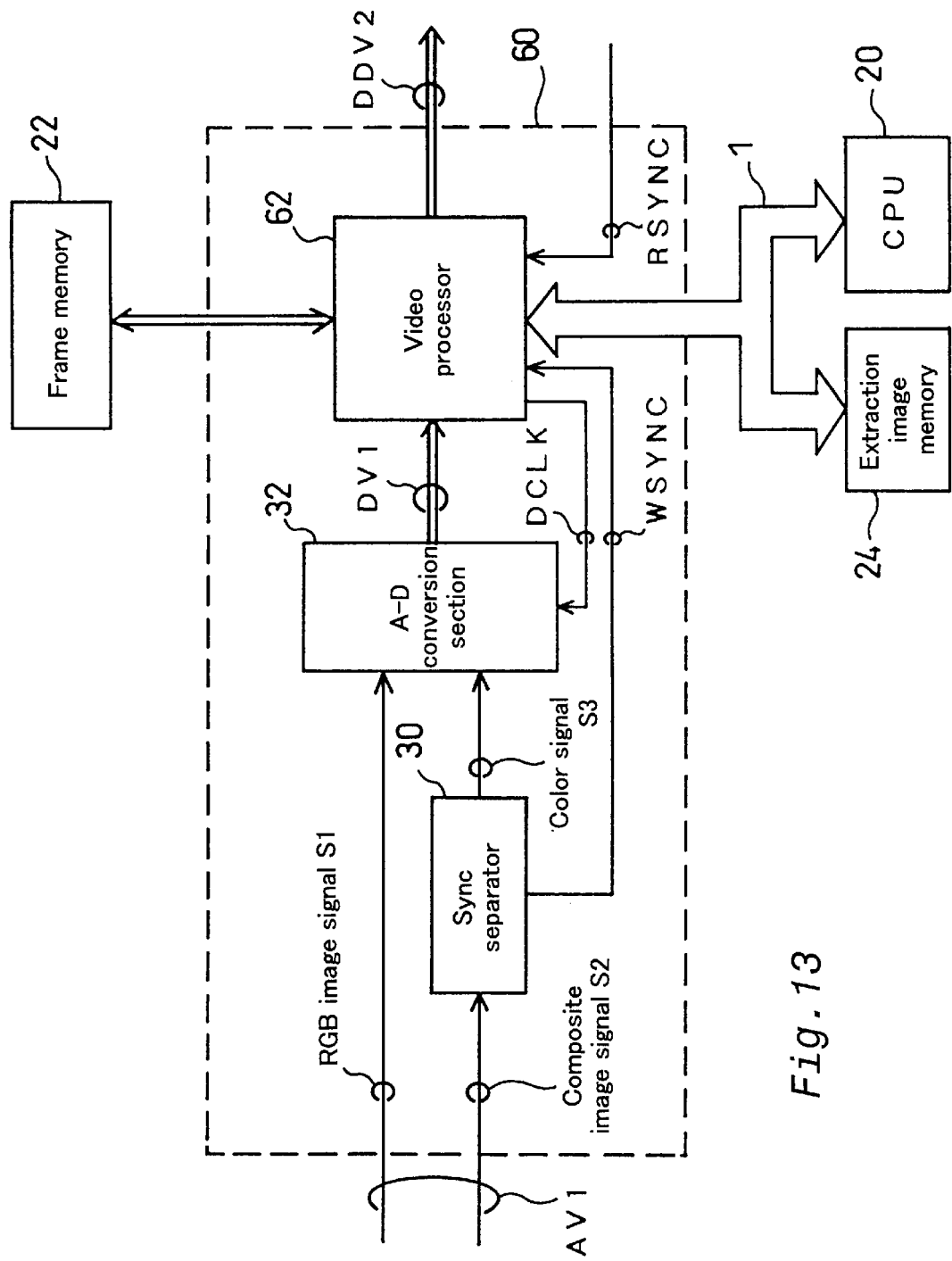
FIG. 13 is a block diagram for schematically illustrating the configuration of a video signal conversion circuit 60.

FIG. 13 is a block diagram for schematically illustrating the configuration of the video signal conversion circuit 60. The video signal conversion circuit 60 includes a sync separator 30, an A–D conversion section 32 and a video processor 62. The sync separator 30 and A–D conversion section 32 have the same functions as the first embodiment, so further explanation thereof will be omitted.

The video processor 62 is a microprocessor that performs overlay processing of the input image data and extraction image bitmap data, and controls the input and output of overlay image data to and from the frame memory 22.

The image data DV1 output by the A–D conversion section 32 and the extraction image bitmap data BMD1 expanded in the extraction image memory 24 are input to the video processor 62. In the video processor 62 the overlay image data is produced by selecting the image data DV1 and the extraction image bitmap data BMD1, and written into the frame memory 22. A data selector in the video processor 62 is used for selection of the image data DV1 and extraction image bitmap data BMD1.

Figure 14:
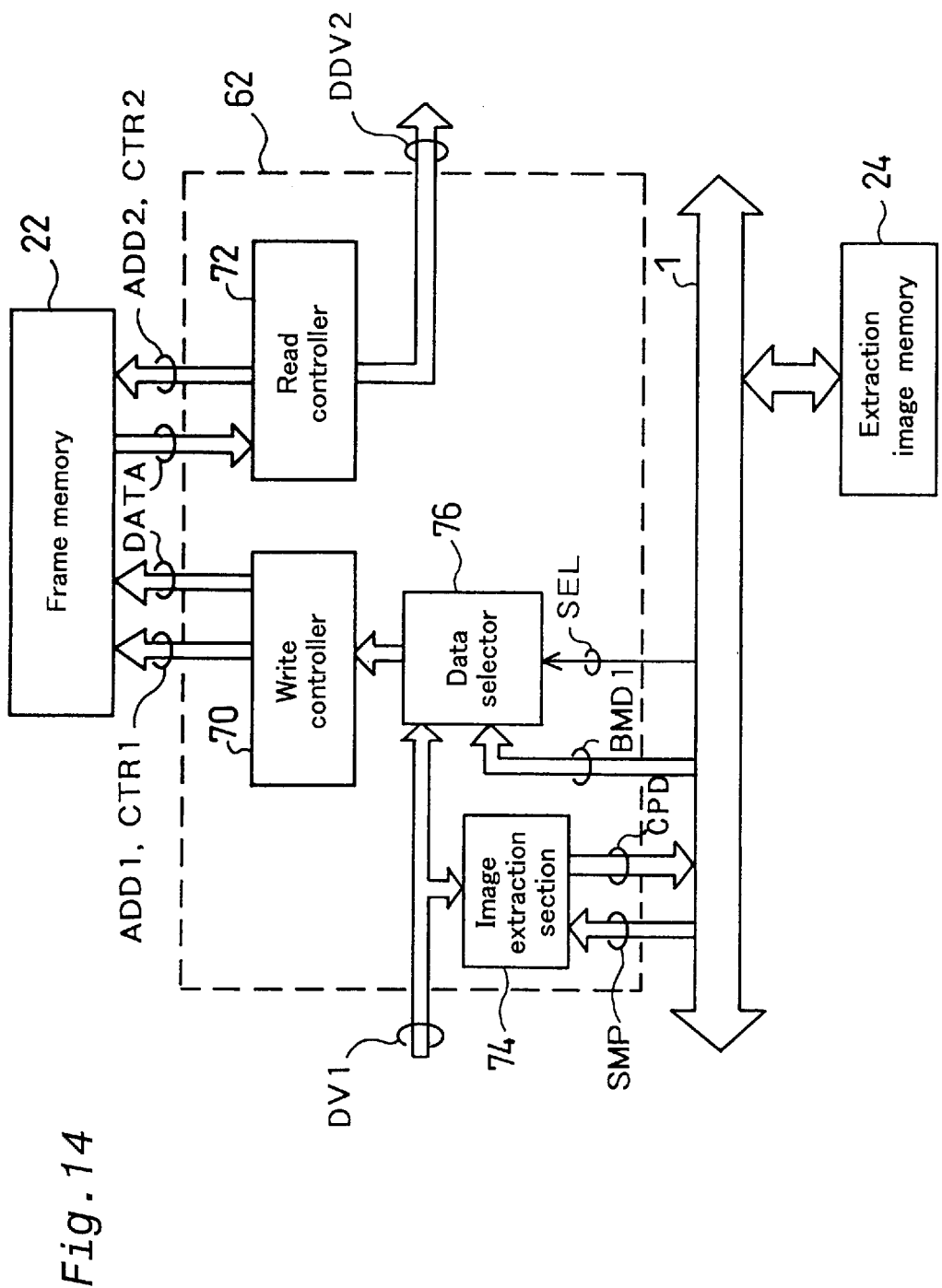
FIG. 14 is a block diagram showing a configuration of the video processor 62.

FIG. 14 is a block diagram showing the configuration of the video processor 62. The video processor 62 includes a write controller 70, a read controller 72, an image extraction section 74 and a data selector 76.

When image data DV1 is input to the video processor 62, the image extraction section 74 (FIG. 14) extracts the specified portion of the image data DV1, compresses the data and stores it in the extraction image memory 24 via the bus 1. The extraction image data does not have to be compressed, and it can be reduced instead. The remote controller 29 can be used to specify the portion of the image data to be extracted. When the extraction portion has been specified, the CPU 20 outputs a sampling signal SMP corresponding to the extraction portion. Based on the sampling signal SMP, the image extraction section 74 extracts the pixel data of the specified portion. In this way, it is possible to extract just the data relating to the pixels of the specified area.

Image data DV1 and extraction image bitmap data BMD1 expanded in the extraction image memory 24 are input to the data selector 76 (FIG. 14), along with a selection signal SEL. There is a data selector 76 for each of the RGB colors. The selection of the image data DV1 and extraction image bitmap data BMD1 is done on a pixel data by pixel data basis and is controlled by means of the selection signal SEL. Thus, based on the selection signal SEL, the data selector 76 selects pixel data either one of the image data DV1 and the extraction image bitmap data BMD1 and writes the data into the frame memory 22. This data written into the frame memory 22 forms the overlay image data comprised of the original image overlaid with the extraction image. The selection signal SEL is generated by the CPU 20 according to the coordinate data PD.

In this embodiment the overlay images seem filled in on the original image.

This corresponds to when, in the first embodiment, the coefficients (k1, k2) of the multipliers 40 and 42 of extraction image overlay circuit 12 (FIG. 5) are set at (0, 1) with respect to the extraction image overlay portion.

When extraction image bitmap data BMD1 is expanded as shown in FIG. 6(b), only the extraction image bitmap data BMD1 for the area defined by the coordinate data PD coordinates (x1, y1) and (x2, y2) is input to the data selector 76. The timing of the input of the extraction image bitmap data BMD1 to the data selector 76 is controlled by the CPU 20, based on the sync signal WSYNC and the coordinate data PD. The timing of the input of the extraction image bitmap data BMD1 is determined by using coordinate data PD of the extraction image bitmap data BMD1 to obtain the input timing of the pixel image data DV1 for the overlay position. Simultaneously with the input of the extraction image bitmap data BMD1, the extraction image bitmap data BMD1 is selected by the selection signal SEL. In this way, a selection between image data DV1 and extraction image bitmap data BMD1 can be made with respect to each pixel assigned to the same position in the image.

When the extraction image bitmap data BMD1 is expanded as shown in FIG. 7, pixel data of the image data DV1 and extraction image bitmap data BMD1 corresponding to the same position in the image are input simultaneously to the data selector 76. The input pixel data is specified based on the sync signal WSYNC. Thus, pixel data can be assigned to the same position in the original image by synchronizing the readout of the extraction image bitmap data BMD1 from the extraction image memory 24 with the input of the image data DV1 to the video processor 62. Also, the extraction image can be superimposed on the original image by using the coordinate data PD as a basis for supplying the selection signal SEL to the data selector 76.

When overlay image data is written to, or read from, the frame memory 22, the write controller 70 and read controller 72 generate addresses ADD1, ADD2 and control signals CTR1, CTR2, which are supplied to the frame memory 22.

Overlay image data is written to the frame memory 22 in accordance with address ADD1 and control signal CTR1 generated by the write controller 70, and read out of the frame memory 22 in accordance with address ADD2 and control signal CTR2 generated by the read controller 72. These addresses and control signals are based on the sync signals WSYNC and RSYNC.

The writing of overlay image data to the frame memory 22 is synchronized with the sync signal WSYNC. The reading of overlay image data from the frame memory 22 is synchronized with the sync signal RSYNC output by the liquid crystal display driver circuit 14 (FIG. 12). The sync signals WSYNC and RSYNC are not mutually synchronized. However, sync signals WSYNC and RSYNC can be synchronized.

In this embodiment the overlay image data can be obtained by writing directly to the frame memory 22. Overlay image data written to the frame memory 22 is read out by the video processor 62.

Overlay image data DDV2 output by the video signal conversion circuit 60 (FIG. 12) is supplied to the liquid crystal display driver circuit 14 (FIG. 12). Based on this overlay image data DDV2, the liquid crystal display driver circuit 14 displays on the liquid crystal display panel 16 the image overlaid with the extraction image. The image displayed on the liquid crystal display panel 16 is projected onto the projection screen 104 by the optical systems 100 and 102.

In the first and second embodiments described in the foregoing, at least a portion of images input to the projection display apparatus can be extracted as the extraction image internally. It is therefore possible to extract part of one input image and overlay it on another. This means it is possible to extract an image from an image signal input from a personal computer, video recorder or TV and overlay the extracted image on an input image. Moreover, by using the coordinate data PD, an extraction image can be superimposed at any desired point on the input image, and enlarged or reduced.

C. Third Embodiment

Embodiments of a second aspect of the invention are described below.

Figure 15:
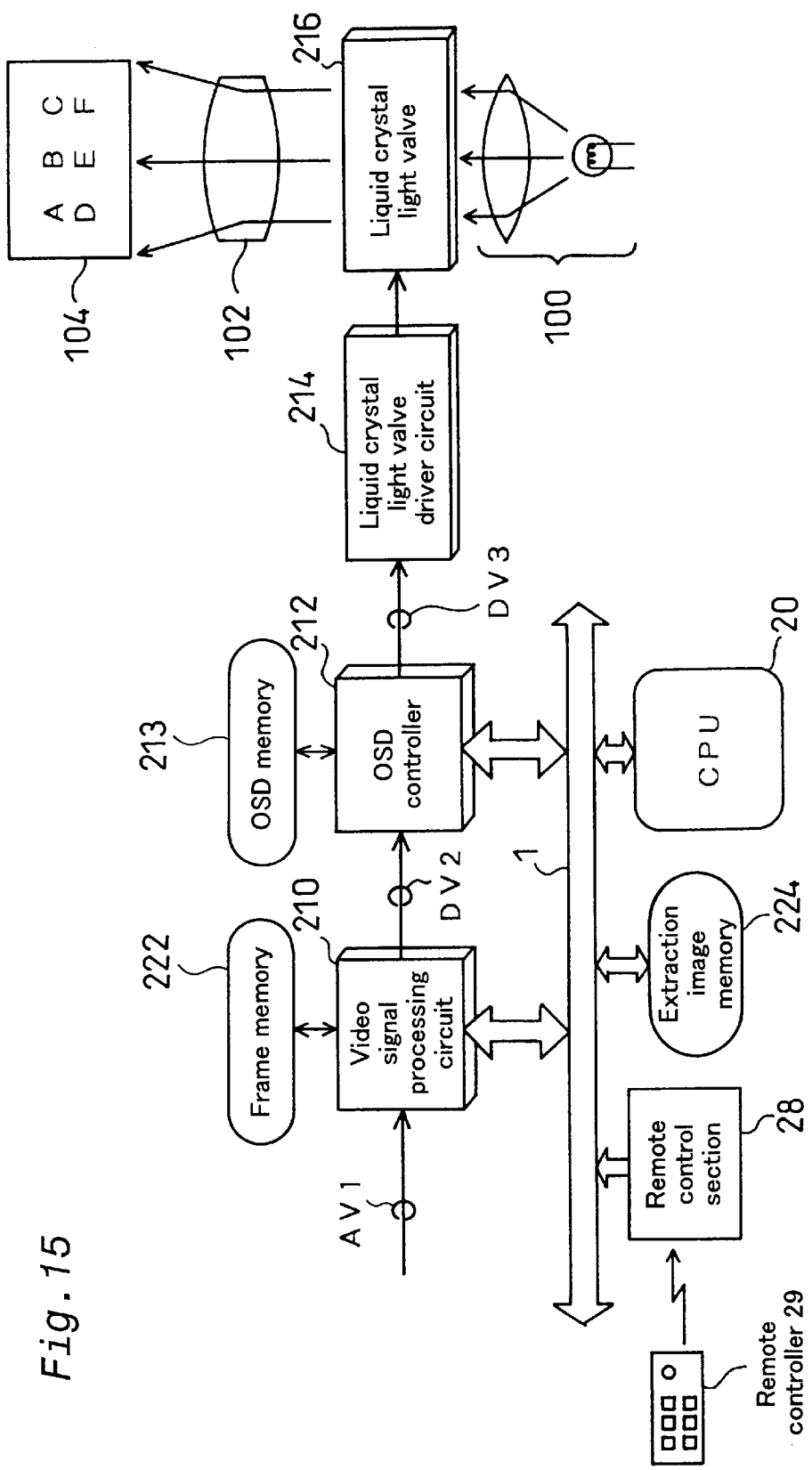
FIG. 15 is a block diagram for schematically illustrating the general configuration of an embodiment of the projection display apparatus according to a second aspect of the invention.

C-1. Configuration and Operation of the Projection Display Apparatus:

FIG. 15 is a block diagram for schematically illustrating the general configuration of an embodiment of the projection display apparatus according to a second aspect of the invention. The projection display apparatus includes a video signal processing circuit 210, an on-screen display (OSD) controller 212, an OSD memory 213, a liquid crystal light valve driver circuit 214, a liquid crystal light valve 216, a frame memory 222, an extraction image memory 224, a remote control section 28, a CPU 20, an illumination optical system 100 and a projection optical system 102. The video signal processing circuit 210, OSD controller 212, extraction image memory 224, remote control section 28 and CPU 20 are connected by a bus 1.

The video signal processing circuit 210 is used to perform analog-digital conversion of input analog video signals AV1, write the converted image data into the frame memory 222 and retrieve image data from the frame memory 222. The analog video signal AV1 can be an RGB signal S1 carrying a computer screen image, or a composite image signal S2 from a video recorder, TV or the like.

Figure 16:
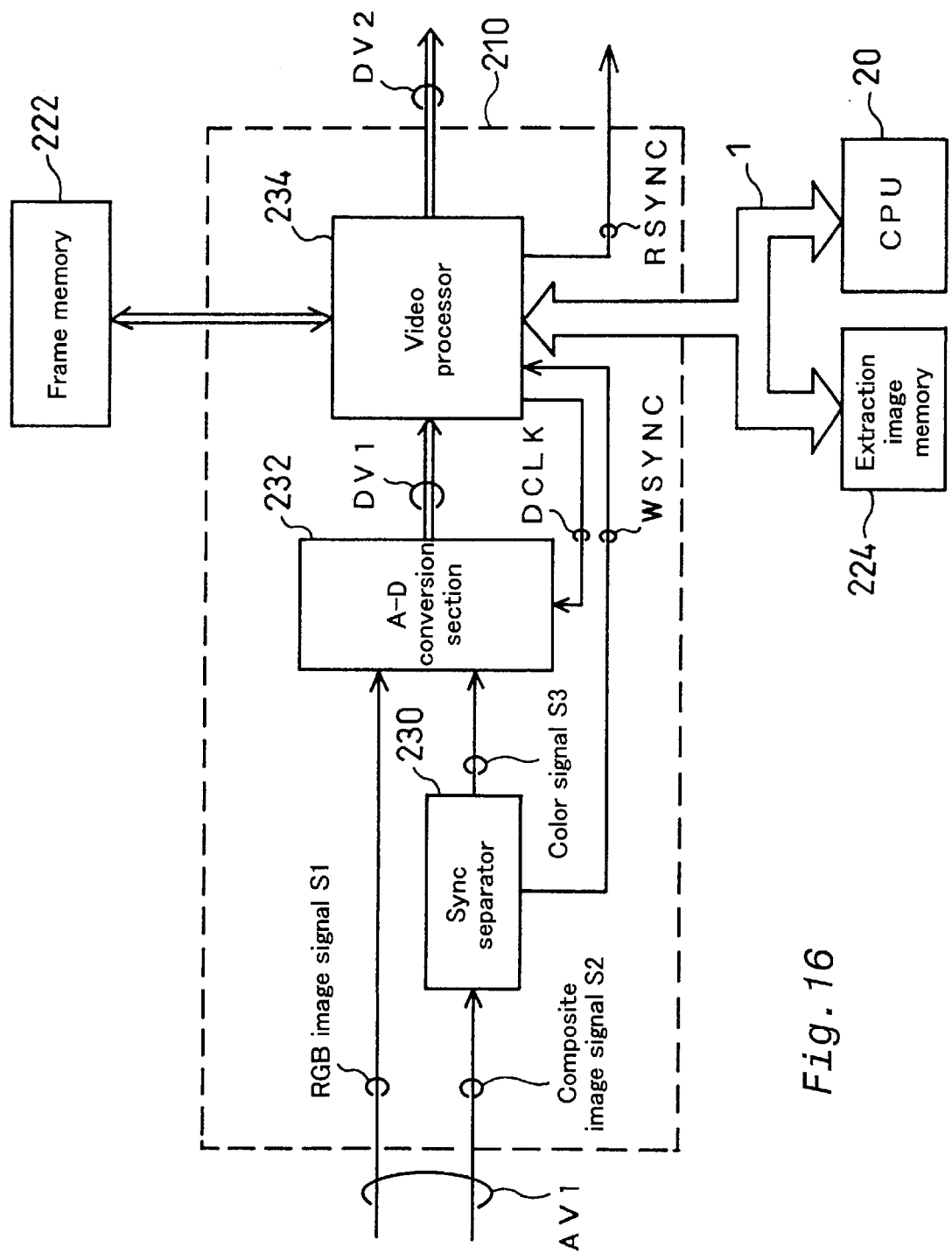
FIG. 16 is a block diagram for schematically illustrating the configuration of the video signal processing circuit 210.

FIG. 16 is a block diagram for schematically illustrating the configuration of the video signal processing circuit 210. The video signal processing circuit 210 includes a sync separator 230, an A–D conversion section 232 and a video processor 234. The functions of the sync separator 230 and A–D conversion section 232 are the same as those of the sync separator 30 and A–D conversion section 32 of the first embodiment (FIG. 2), so further explanation thereof will be omitted.

The video processor 234 is a microprocessor that performs various image processing functions such as controlling the input and output of image data and extraction image data to and from the frame memory 222 and extraction image memory 224. Image data DV1 from the A–D conversion section 232 is input to the video processor 234. Specific image data that includes extraction image data CPD1 stored in the extraction image memory 224 and background image data BGD1 generated by the CPU 20 is input to the video processor 234, via bus 1.

Figure 17:
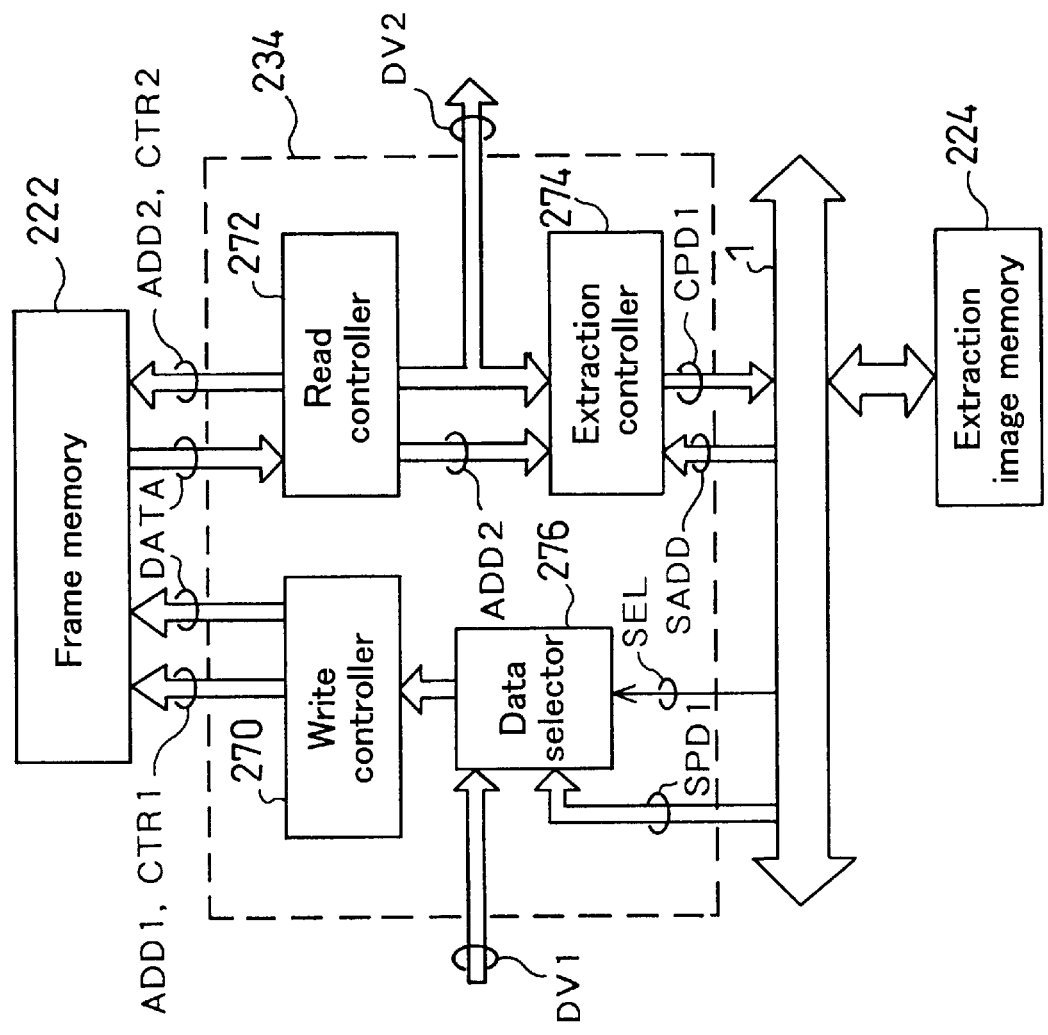
FIG. 17 is a block diagram showing a configuration of the video processor 234.

FIG. 17 is a block diagram showing the configuration of the video processor 234. The video processor 234 includes a write controller 270, a read controller 272, an extraction controller 274 and a data selector 276. The controllers 270 and 272 have the same functions as the controllers 70 and 72 of the first embodiment (FIG. 3), so further explanation thereof will be omitted.

Image data DV1 and specific image data SPD1 that includes extraction image bitmap data BMD1 stored in the extraction image memory 224 and background image data BGD generated by the CPU 20 are input to the data selector 276, along with a selection signal SEL. There is a data selector 276 for each of the colors RGB. The selection of the image data DV1 and specific image data SPD1 is controlled by the selection signal SEL. Which data is selected depends on whether the system is in normal display mode or specific image display mode. These modes are discussed below. Based on the selection signal SEL, the data selector 276 selects either image data DV1 or specific image data SPD1. Thus, according to the system mode, either one of image data DV1 and specific image data SPD1 is written into the frame memory 222. When user uses the remote controller 29 to select the system mode, the selection signal SEL is generated by the CPU 20.

The writing of image data to the frame memory 222 is synchronized by the sync signal WSYNC when the data to be written to the memory 222 is input image data DV1. When the data to be written to the memory 222 is specific image data SPD1, the write operation is controlled by signals supplied to the write controller 270 by the CPU 20. The retrieval of image data from the frame memory 222 and the downstream processing of image data DV2 output by the video processor 234 are synchronized by the sync signal RSYNC output by the liquid crystal display driver circuit 214 (FIG. 15), discussed below, which is optimized for driving the liquid crystal light valve 216. The sync signal RSYNC is produced by a sync signal generator (not shown) in the video processor 234. The sync signals WSYNC and RSYNC are not mutually synchronized. However, sync signals WSYNC and RSYNC can be used synchronized. The sync signal generator does not have to be provided in the video processor 234, and can instead be provided in the liquid crystal light valve driver circuit 214, for example, or can be configured as an independent component.

When image data that has been written to the frame memory 222 is read out, the function of the extraction controller 274 is to extract a specified portion of the image data. The extraction controller 274 also enlarges or reduces the extraction image data in accordance with the enlarging/reducing factor that has been set. Another function of the extraction controller 274 is to write the extraction image data CPD1 to the extraction image memory 224 via the bus 1. The portion of the image data to be extracted (extraction area) can be specified using the remote controller 29. When the extraction area has been specified, the CPU 20 outputs an extraction address SADD corresponding to the extraction portion. Based on the extraction address SADD and address ADD2 read from the read controller 272, the extraction controller 274 extracts the image data of the specified portion. This make it possible to extract only the specified portion of the image data.

Image data DV1 or specific image data SPD1 stored in the frame memory 222 is read out of the frame memory and output from the video processor 234 as image data DV2. The readout operation is synchronized by the sync signal RSYNC.

The extraction image memory 224 shown in FIG. 15 is for storing extraction image data CPD1 extracted by the extraction controller 274 of the video processor 234 (FIG. 17). Extraction image data CPD1 is stored in the extraction image memory 224 in a specific format. There are no particular limitations on the specific format other than it be decided beforehand. For example, it can be compressed data, or bitmap data. If the extraction image data CPD1 is specified as compressed data, it is written into the extraction image memory 224 after being compressed by the CPU 20 or the extraction controller 274. Similarly, when the data is read out of the extraction image memory 224, it is expanded by the CPU 20 or the extraction controller 274.

Figure 18:
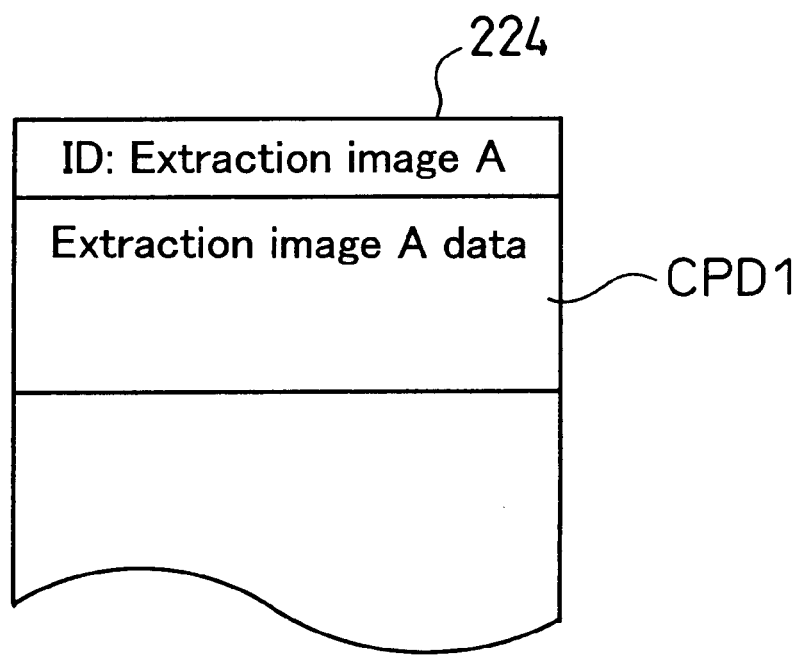
FIG. 18 is a diagram illustrating the extraction image memory 224.

FIG. 18 is a diagram illustrating the extraction image memory 224. The extraction image memory 224 stores the data for one extraction image. The stored data includes an information ID denoting the content of the extraction image data, and extraction image data CPD1. The extraction image memory 224 is not limited to storing one set of data, and may instead be used to store multiple sets.

The OSD controller 212 shown in FIG. 15 generates OSD image data representing pointer images and menu screens for controlling the functions of each part of the projection display apparatus in accordance with commands received from the remote controller 29 via the remote control section 28. The OSD memory 213 contains pointer image data and graphics and font data for the menu screens, stored in a specific format. To display the menu screens and pointers images, the OSD controller 212 reads out the corresponding data from the OSD memory 213 and generates OSD image data. The OSD controller 212 combines this OSD image data with image data DV2 output by the video signal processing circuit 210. The image data DV2 and OSD image data could also be combined by providing the OSD controller 212 with a selector. Alternatively, it could be done by providing two multipliers that multiple the image data DV2 and OSD image data by a fixed factor, and an adder that adds the results of the multiplications. Images for specifying the extraction area (extraction area specifying image) are generated by the OSD controller 212.

Image data DV3 output by the OSD controller 212 is input to the liquid crystal light valve driver circuit 214. Based on the image data DV3, the illumination light from the illumination optical system 100 is modulated by the liquid crystal light valve 216, and the modulated light is projected onto the screen 104 by the projection optical system 102 to display the image. The liquid crystal light valve 216 corresponds to the electro-optical device of the second aspect of the invention. The liquid crystal light valve driver circuit 214 corresponds to the image display signal generator of the second aspect of the invention.

Here, the term projection optical system is used in a broad sense that also encompasses the illumination optical system. The liquid crystal light valve driver circuit 214 can be formed on the substrate of the liquid crystal light valve 216 as the electro-optical device, integrating the two components.

The image data DV3 output by the OSD controller 212 can be enlarged or reduced by an enlarging/reducing circuit (not shown) provided between the OSD controller 212 and the liquid crystal light valve driver circuit 214.

The projection display apparatus is controlled by the remote control section 28, based on commands from the remote controller 29 (FIG. 15). The remote control section 28 controls mainly processing related to extraction images. In accordance with commands received from the remote controller 29, this includes specifying the extraction portion of the image data, and whether extraction images are displayed or not.

The functions of the video signal processing circuit 210, OSD controller 212 and remote control section 28 can be implemented by a computer program instead of in hardware.

Figure 19:
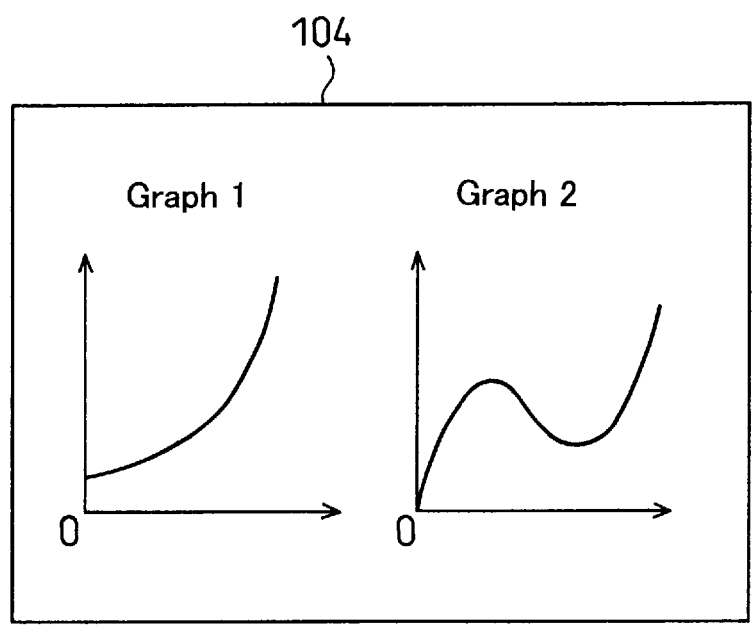
FIG. 19 is a diagram for explaining externally input images displayed on a projection screen 104.
Figure 20:
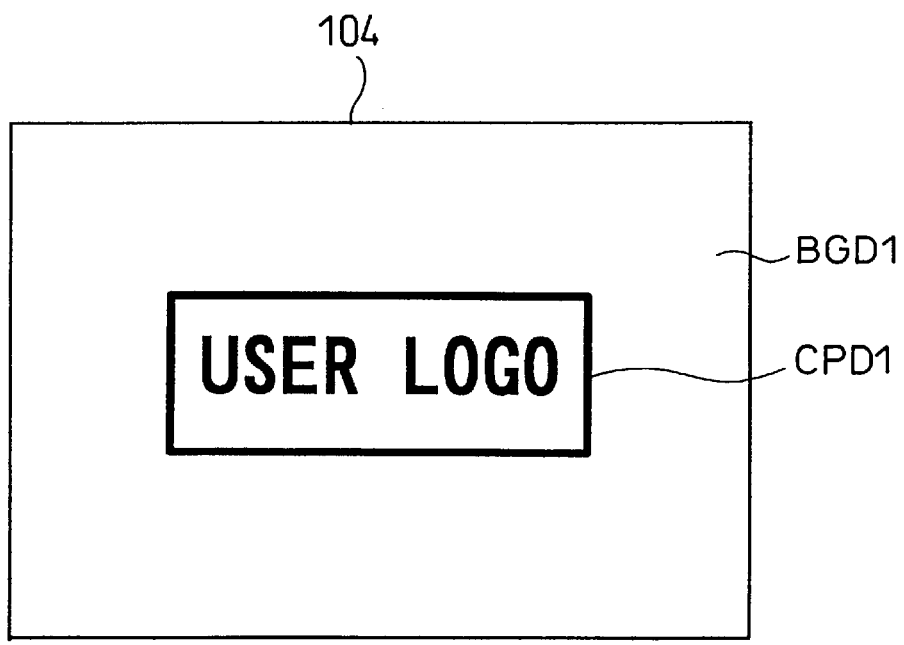
FIG. 20 is a diagram for explaining the projection screen display of a specific image represented by the specific image data SPD1 that includes background image data BGD1 and extraction image data CPD1 stored in extraction image memory 224.

When the remote controller 29 is used to select the normal image display mode, digital image data DV1 representing analog image signals AV1 externally input to the video signal processing circuit 210 is stored in the frame memory 222 and the images can be displayed on the screen 104. FIG. 19 is a diagram for explaining externally input images displayed on the projection screen 104. When the remote controller 29 is used to select the specific image display mode, background image data BGD1 generated by the CPU 20 and extraction image data CPD1 stored in the extraction image memory 224 are stored in the frame memory 222 as specific image data SPD1 and the specific images represented by the data SPD1 can be displayed on the screen 104. FIG. 20 is a diagram for explaining the projection screen display of a specific image represented by the specific image data SPD1 that includes background image data BGD1 and extraction image data CPD1 stored in extraction image memory 224.

Figure 21A:
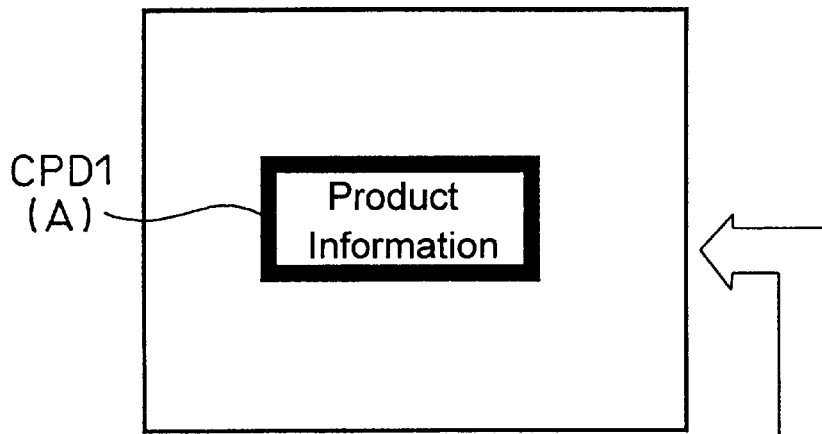
FIGS. 21(a)–(c) are diagrams for explaining the display on the projection screen 104 of sequentially selected extraction images represented by extraction image data CPD1 (A), CPD1 (B) and CPD1 (C).
Figure 21B:
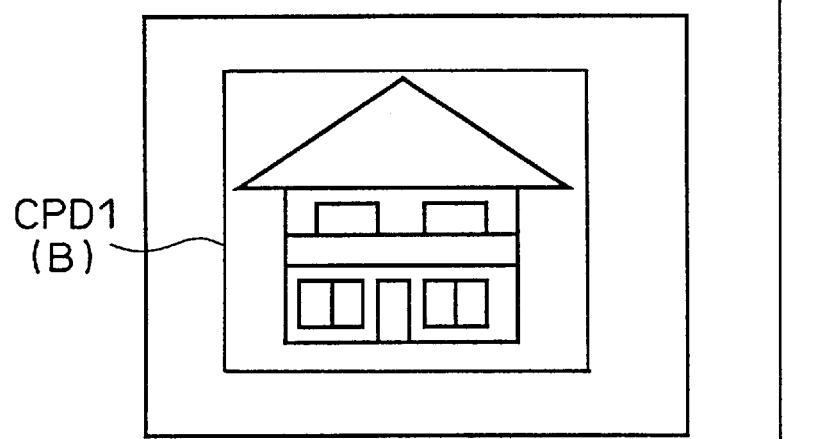
Figure 21C:
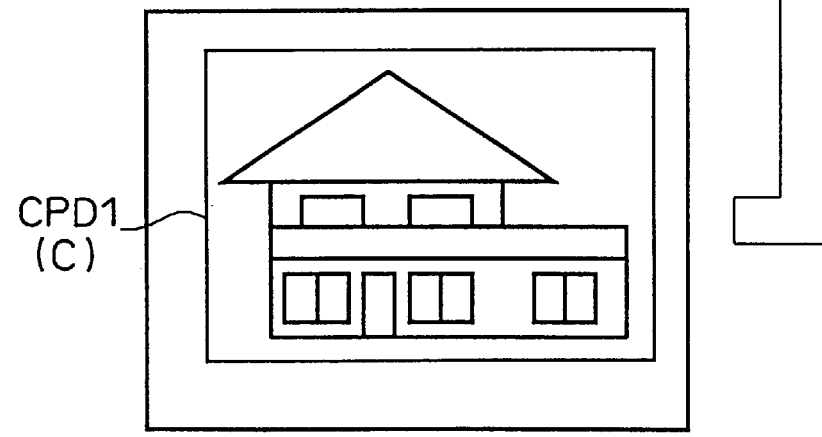

When the user selects the specific image display mode, an extraction image an be selected from among those stored in the extraction image memory 224 and displayed as a specific image. It is also possible to select multiple extraction images from among those stored in the extraction image memory 224 and have them displayed repeatedly in order. FIGS. 21(a)–(c) are diagrams for explaining the display on the projection screen 104 of sequentially selected extraction images represented by extraction image data CPD1 (A), CPD1 (B) and CPD1 (C).

During question and answer sessions in a presentation or when a short time is needed before a new set of images can be displayed, the presentation can be enhanced by displaying specific images in the form of corporate logos and product images and the like instead of presentation images.

The extraction image data CPD1 stored in the memory 224 can be extracted as explained below.

C-2. Extracting Images:

FIGS. 22 to 27 are diagrams illustrating the procedure for cutting away from an image being input to the projection display apparatus, to an extraction image (a user logo image). FIGS. 22 to 27 shown display images on the projection screen 104.

The remote controller 29 has a menu key (not shown). When the menu key is pressed, the OSD controller 212 (FIG. 15) displays a menu screen. Selecting the menu entry "Extraction image setting " and pressing the enter key on the remote controller 29 initiates the extraction image setting mode. Below, the term "select" will be used to mean using the remote controller 29 to select a menu item such as letters and areas and pressing the enter key on the remote controller 29. When the extraction image setting mode starts, the writing of data to the frame memory 222 is stopped. This stop can be done according to starting the extraction image setting mode. A user can use the selection of this mode by using remote controller 29 as a way of stopping a display of such as moving images.

Figure 22:
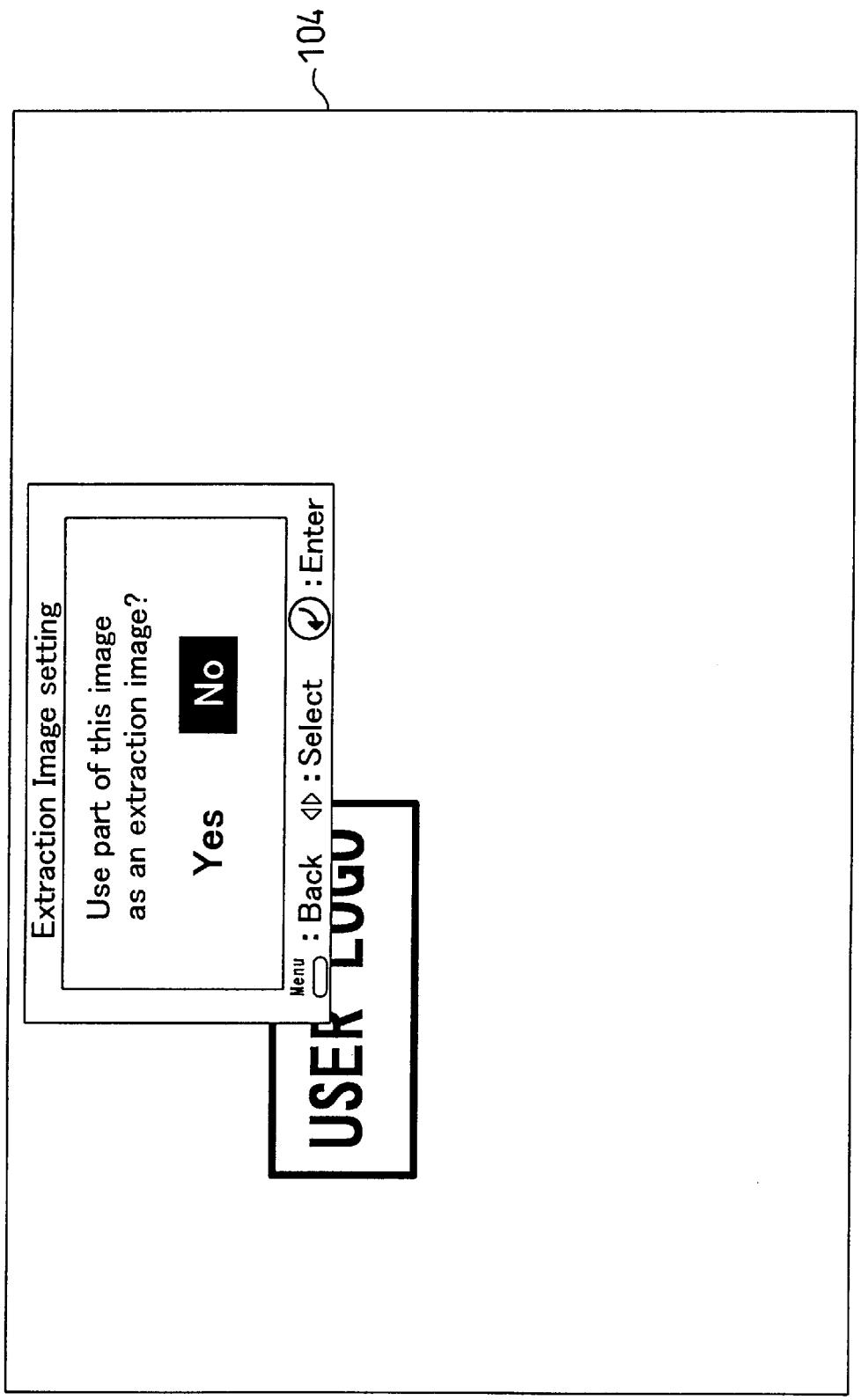
FIG. 22 is a diagram to illustrate the procedure for cutting away from an image being input to the projection display apparatus, to a user logo image.

When the writing of data to the frame memory 222 stops, the image in the frame memory 222 at that point is displayed on the screen, as shown in FIG. 22.

Figure 23:
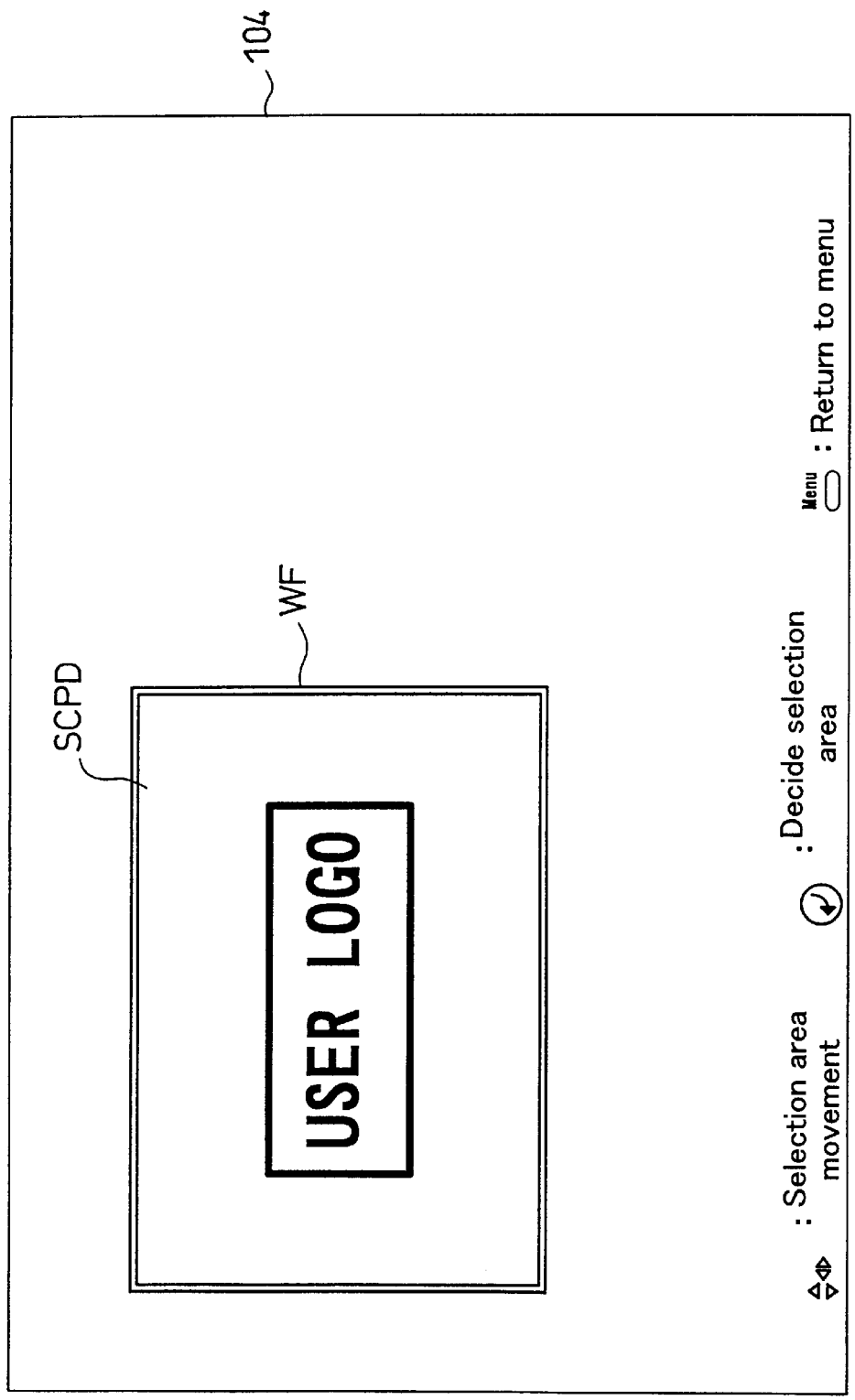
FIG. 23 is a diagram for explaining the procedure for cutting away from an image being input to the projection display apparatus, to a user logo image.

Also, the extraction image setting screen is displayed by the OSD controller 212, showing the question "Use part of this image as an extraction image?" It is decided whether or not to extract image from present displayed image. Extracted image is referred to as extraction target image. If "No" is selected, the extraction image setting mode is terminated and the menu screen reappears. If "Yes" is selected, the OSD controller 212 displays a selecting frame WF of a preset size for selecting the extraction image, as shown in FIG. 23. The selecting frame WF comprises two black outlines separated by a white space. This makes the selecting frame WF readily visible on the images. Thus, user can easily select a extraction area. If required, a system configuration can be used that allows the size of the frame to be set by the user. On the remote controller 29, a pointing device, such as an arrow-key device, is used to position the selecting frame WF and select the part to be extracted on the extraction target image.

Figure 24:
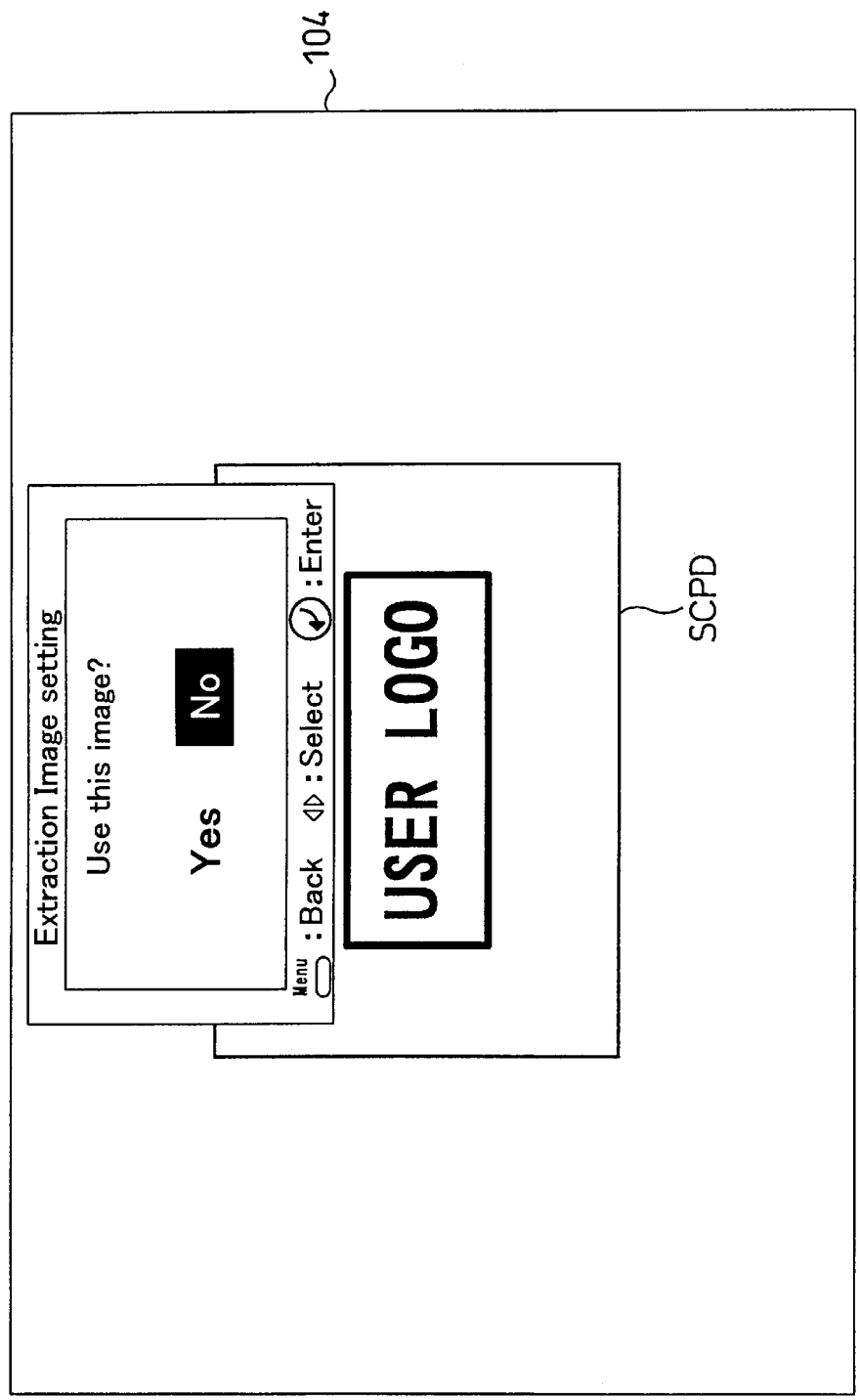
FIG. 24 is a diagram for explaining the procedure for cutting away from an image being input to the projection display apparatus, to a user logo image.
Figure 25:
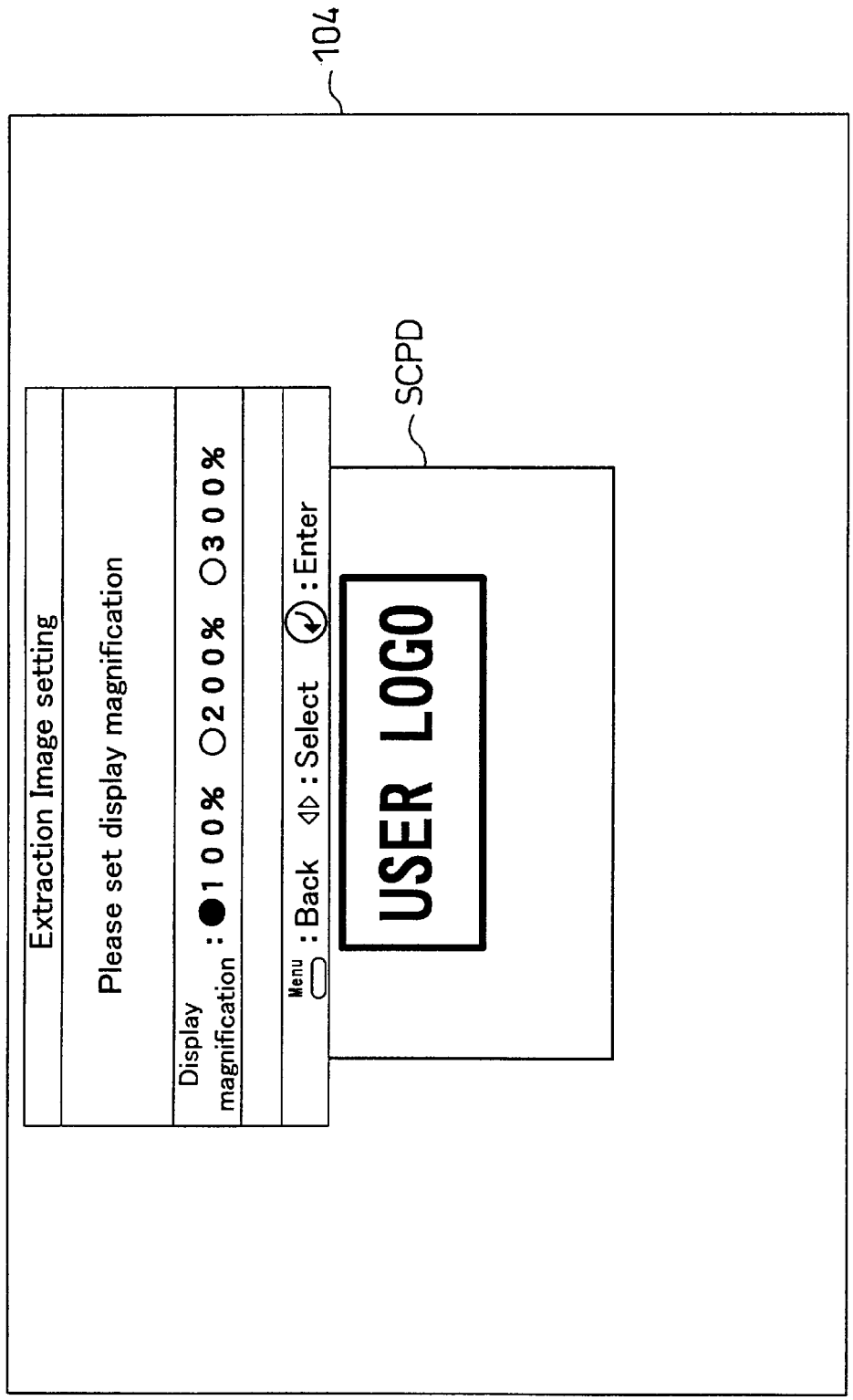
FIG. 25 is a diagram for explaining the procedure for cutting away from an image being input to the projection display apparatus, to a user logo image.

As shown in FIG. 24, when user selects the part of the extraction target image, the selected image (referred to as selected extraction image) SCPD is then displayed in the center of the screen. A black image is used to mask portions other than the selected extraction image SCPD. The OSD controller 212 then displays the question "Use this image?" on the extraction image setting screen. It is decided whether or not to use the present image. If "No" is selected, the extraction image setting mode is terminated and the menu screen reappears. If "Yes" is selected, the OSD controller 212 displays "Please set display magnification," shown in FIG. 25.

When one of the magnifications displayed on the extraction image setting screen is chosen, the selected extraction image SCPD is displayed at that magnification. If a different magnification is then chosen, the image will be displayed at the new magnification. This enables users to try different settings before making a final selection. Desired magnification is set by pressing the enter key. The system can instead be configured to accept any desired magnification setting.

Figure 26:
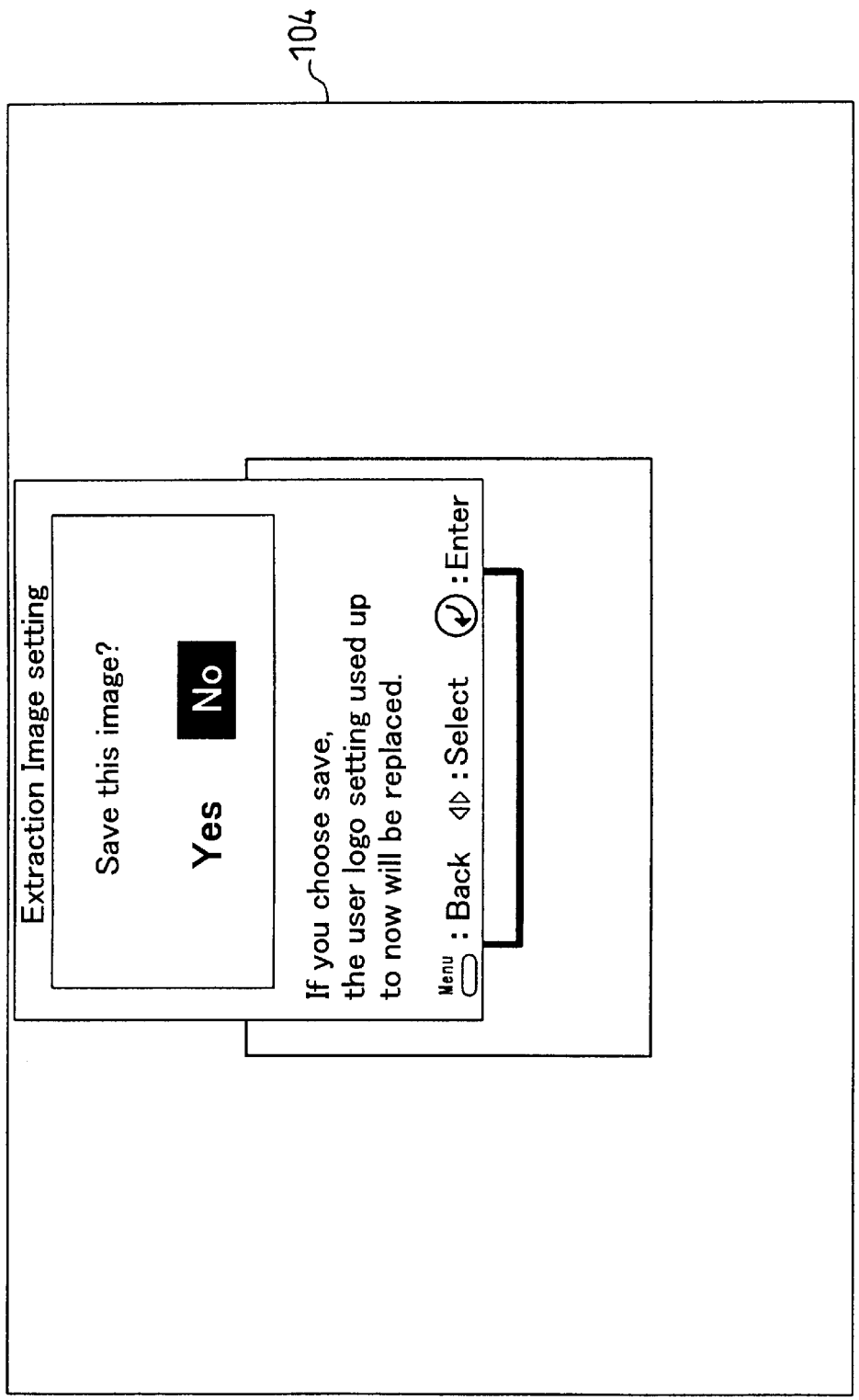
FIG. 26 is a diagram for explaining the procedure for cutting away from an image being input to the projection display apparatus, to a user logo image.
Figure 27:
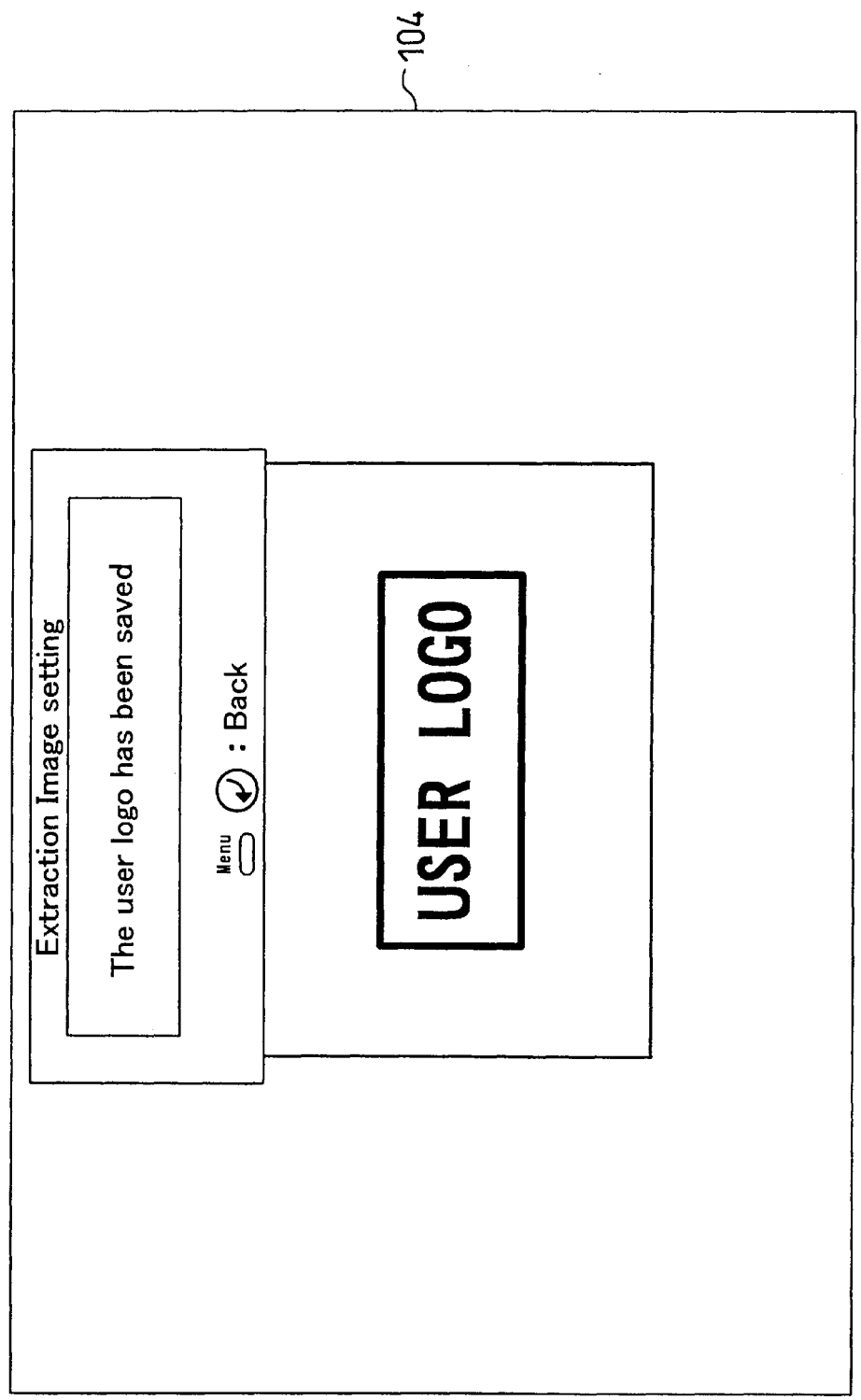
FIG. 27 is a diagram for explaining the procedure for cutting away from an image being input to the projection display apparatus, to a user logo image.

When the extraction image and magnification have been selected, the OSD controller 212 displays "Save this image?" on the extraction image setting screen, as shown in FIG. 26. It is decided whether or not to save the image data representing this image in the extraction image memory 224 (FIG. 15) as extraction image data CPD1. If "No" is selected, the extraction image setting mode is terminated and the menu screen reappears. If "Yes" is selected the extraction image data CPD1 is saved in the extraction image memory 224 (FIG. 15) and the message "The extraction image has been saved" is displayed (FIG. 27). During setting above, menu screen reappears by pressing the menu key.

This procedure enables a user to readily select a desired extraction target image and extract a desired image by following the extraction image setting screens. Also, the image can be saved in the extraction image memory 224 with a chosen condition (magnification), which can be checked before final selection.

The video processor 234, OSD controller 212, remote control section 28 and CPU 20 of this embodiment correspond to the image extraction section and specific image display control section according to the second aspect of the invention.

D. Fourth Embodiment

Figure 28:
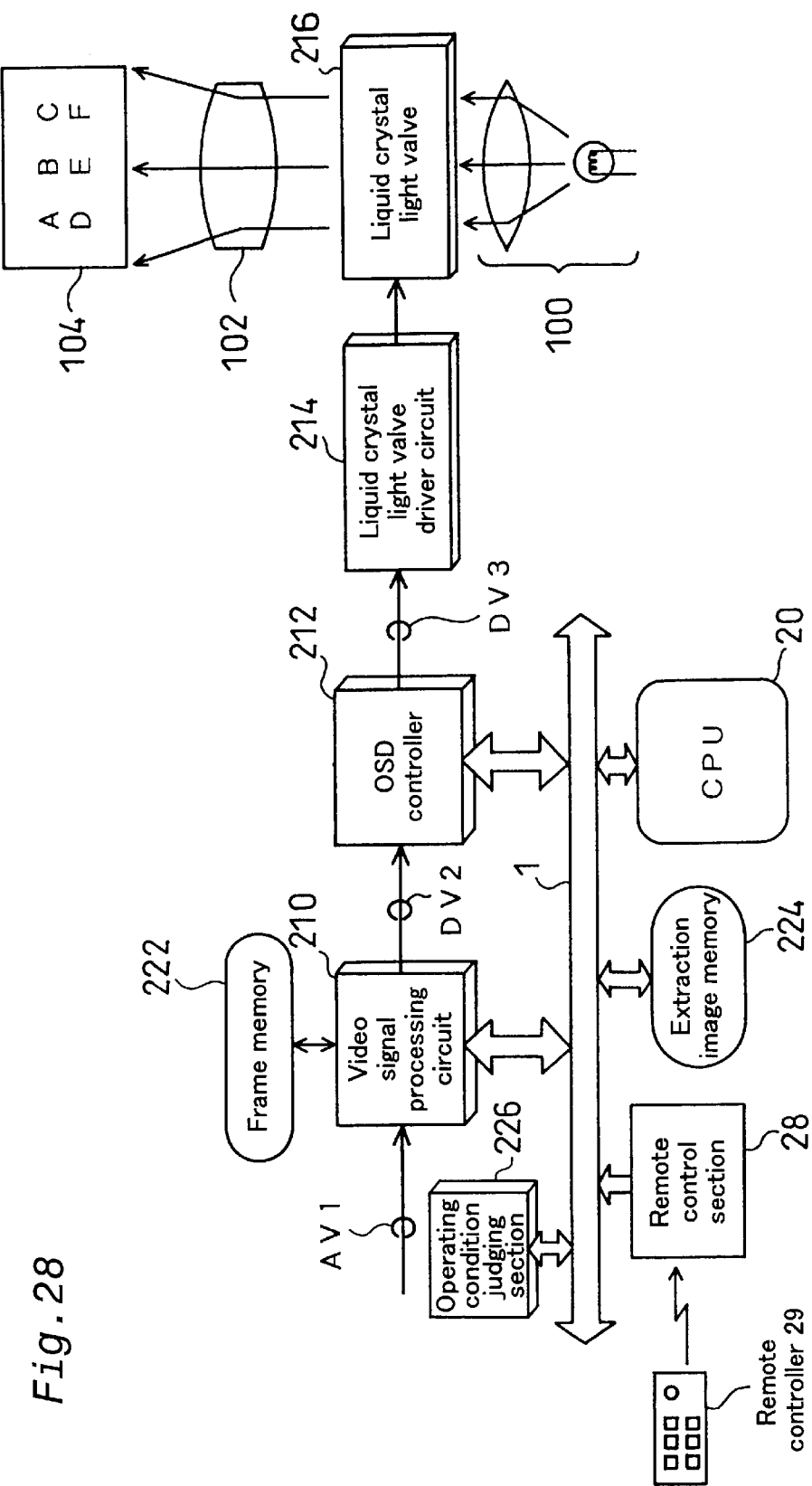
FIG. 28 is a block diagram for schematically illustrating the general configuration of an embodiment of the projection display apparatus according to second and third aspects of the invention.

FIG. 28 is a block diagram for schematically illustrating the general configuration of an embodiment of the projection display apparatus according to second and third aspects of the invention. Other than the inclusion of an operating condition judging section 226, this projection display apparatus has the same configuration as that of the third embodiment, so further explanation thereof will be omitted.

FIG. 29 is a block diagram showing the configuration of the operating condition judging section 226. The operating condition judging section includes an image signal detector 242, a system start detector 244 and a judging section 246. The image signal detector 242 receives the sync signal WSYNC included in the image signal and detects whether an image signal is being input to the projection display apparatus. The system start detector 244 receives a power supply voltage Vcc and detects whether the projection display apparatus is on and can display an image. Based on the detection signals D1 and D2 signifying detection by the image signal detector 242 and system start detector 244, the judging section 246 judges whether an externally input image can be displayed.

FIGS. 30(a)–(e) are time charts of the operation of the operating condition judging section 226. FIG. 30(a) shows the power supply voltage Vcc, FIG. 30(b) shows start detection signal D2 output from the system start detector 244, FIG. 30(c) shows the sync signal WSYNC included in image signals input to the projection display apparatus, FIG. 30(d) shows detection signal D1 output from the image signal detector 242, and FIG. 30(e) shows operating condition judging signal SPDMODE.

When the supply voltage Vcc is high enough for the projection display apparatus to start operating, after a prescribed interval T2 the start detection signal D2 changes from Low to High. Once the projection display apparatus is provided with a supply voltage, it is ready to display specific images in a relatively short time. However, some time is required as a stabilization period before externally input images can be displayed, to allow such as sync clocks to be generated on which internal circuits are operated. The period T2 represents this stabilization period. When the start detection signal D2 is Low it signifies that the system is not yet display-operational. At this time, the operating condition judging signal SPDMODE also is Low, signifying that the system is in the specific image display mode in which specific images are displayed. When the start detection signal D2 goes High, signal SPDMODE also goes High, signifying the system is in the normal display mode in which input images are displayed.

The image signal detector 242 detects whether the sync signal WSYNC is being input at prescribed intervals Tc as shown in FIG. 30(c). When the pulse signal is being input at the prescribed intervals Tc, sync detection signal D1 goes High as shown in FIG. 30(d). When it is detected that pulse signal is not being input at the intervals Tc, after a prescribed period T1 the sync detection signal D1 goes Low. The prescribed period T1 represents a detection margin. When detection signal D1 is Low, operating condition judging signal SPDMODE changes to Low, and specific images can be displayed.

Thus, in this embodiment, after the projection display apparatus has been started the operating condition judging section 226 detects whether the system state enables images to be displayed, and also detects whether an image signal is being received. The system can then automatically switch between normal display mode in which input images are displayed, and specific image display mode in which specific images (explained in third embodiment) are displayed.

The operating condition judging section 226 of this embodiment corresponds to the operating condition judging section of the second and third aspects of the invention. Also, the video processor 234, OSD controller 212 and CPU 20 correspond to the image extraction section and specific image display control section of the second and third aspects.

Although the image signal detector 242 uses the sync signal WSYNC to detect whether image signals are being input, this is not limitative, and various detection methods can be used. For example, color signals or luminance signals could be used, with an image signal staying at black level for a certain time signifying that an image signal is not being received.

The present invention is in no way limited to the details of the examples and embodiments described in the foregoing but various changes and modifications may be made without departing from the scope. For example, the following modifications are also possible.

The first to fourth embodiments have been described using a projection display apparatus as an example, but this is not limitative, with the invention being applicable to various other types of image display apparatus.

In the case of the first embodiment, the data selector 76 shown in FIG. 14 could be used to superimpose the extraction images instead of the two multipliers and 42 and the adder 44 used in the extraction image overlay circuit 12 (FIG. 5). This would enable the extraction images to be given a filled-in effect equivalent to the effect obtained when the coefficients (k1, k2) of the multipliers 40, 42 are set at (1, 0) or (0, 1).

With respect again to the multipliers 40 and 42 and the adder 44 used by the circuit 12 to superimpose extraction images in the first embodiment, if the coefficients k1 and k2 are both set at ½ to provide transparent images, the multipliers 40 and 42 will not be needed. Instead, the same effect can be obtained by effecting a bit shift in the adder 44 to remove the low-order bit from the data that is added.

In the second embodiment, the multipliers and adder shown in FIG. 5 can be used instead of the data selector 76 (FIG. 14) to superimpose extraction images. This would enable transparent as well as filled-in overlay effects to be provided.

In the first and second embodiments, while memory capacity equivalent to one frame of image data is allocated for expanding extraction images, as shown in FIG. 7, the same effect can be obtained by using flags in place of coordinate data PD. For example, the pixel data of an extraction graphic in the extraction bitmap data could be provided with a one-bit flag that could be used to determine the presence or absence of the graphic. Depending on the presence or absence of the flag, an adjustment could be made to the coefficients k1, k2 of the multipliers 40, 42 (FIG. 5), in the case of the first embodiment, or to the selection by the data selector 76 (FIG. 14), in the case of the second embodiment. In this way, the same effect could be obtained as when coordinate data is used.

In the first and second embodiments, extraction image bitmap data BMD1 is expanded and stored in the extraction image bitmap memory 26 or extraction image memory 24, but this expansion is not limited to the memories 26 and 24 and may be effected in other storage areas prepared for the purpose.

In the first and second embodiments, the only extraction images stored in the extraction image memory 24 are those extracted by the extraction controller 74, but this is not limitative. Instead, images produced using other devices, such as scanned images and images produced on a computer, can also be stored in the extraction image memory 24. Doing this makes it possible to overlay original images with other images in addition to images extracted by the projection display apparatus.

In the first and second embodiments, moreover, images to be superimposed on input images are maintained in the extraction image memory 24, but the invention is not limited to this configuration. Instead, bitmap data of graphics drawn using the remote controller 29 could be written directly to the extraction image bitmap memory 26, enabling drawn images to be used as overlays. This would make it possible for a user using a drawing program to overlay an extraction image of a desired shape, such as a free curve or the like, specified with the remote control 29.

The third and fourth embodiments have been described with reference to writing specific image data SPD1 into the frame memory 222 to display specific images, but the invention is not limited to this. Instead, for example, the specific image data SPD1 can be written to the OSD memory 213 and displayed as OSD images by the OSD controller 212.

The third embodiment, has been described, using as an example, employing the image extraction section according to the second aspect of the invention to display specific images that include arbitrarily extracted images. However, this is not limitative. A projection display apparatus configuration can be used that does not include an image extraction section, with specific images supplied by a computer or from recording media read by a reading apparatus being displayed.

The operating conditions described with reference to the fourth embodiment are not limited to the operational status of the projection display apparatus or to whether image signals are being received. Various other conditions can be set and associated detection circuits included in the operating condition judging section.

In the first and second embodiments a liquid crystal display panel 16 is used as the light modulation unit of the projection display apparatus, but the invention is not limited to this and can use as the light modulation unit any means that is able to modify luminance based on the image data. For example, a light modulation unit can be used that utilizes light reflected by a pixel array of mirror elements, or a CRT or plasma display panel or the like. Note that, usually, a CRT or plasma display panel are not called light modulation unit.

Similarly, the electro-optical device used in the third and fourth embodiments is not limited to the liquid crystal light valve 216. Various other devices that emit light according to image signal are usable as electro-optical device, such as a DMD (digital micromirror device, trademark of Texas Instruments Inc.), CRT or plasma display panel.

In the described embodiments, part of the configuration implemented by hardware can instead be implemented by software and, conversely, part of the configuration implemented by software can instead by implemented by hardware.

Industrial Applicability

The present invention is applicable to a variety of image display apparatuses. The projection display apparatuses of the present invention is applicable to projecting onto a screen images input by such as a computer and a video recorder.

What is claimed is:

1. A projection display apparatus that projects images onto a screen, comprising:
   a frame memory for storing image data representing an image to be displayed;
   an image display signal generator for generating image display signals based on the image data stored in the frame memory;
   an electro-optical device for emitting light to form images in response to the image display signals;
   a projection optical system for projecting light emitted by the electro-optical device;
   an image extraction section that extracts at least a portion of an extraction target image selected arbitrarily from images given externally as an extraction image;

an extraction image memory for storing extraction image data representing the extracting image; and a specific image display control section that displays a specific image represented by specific image data including the extraction image data stored in the extraction image memory in a specific operating condition, the specific operating condition including at least one of a state in which no image signal is being given to the projection display apparatus and a state in which a prescribed period has not elapsed after the startup of the projection display apparatus.

2. A projection display apparatus according to claim 1, wherein the image extraction section implements the steps of:

displaying an extraction image setting screen for setting image extraction conditions comprising at least an extraction area and an extraction magnification factor;

displaying an extraction area specifying image used in setting the extraction area on the extraction target image;

when the extraction area is set with the extraction area specifying image, writing into the frame memory selected extraction image data representing a selected extraction image corresponding to the set extraction area;

when a display magnification factor is set, enlarging or reducing the selected extraction image data based on the magnification factor and writing the enlarged or reduced selected extraction image data into the frame memory; and when a desired display magnification factor is determined, storing the selected extraction image data enlarged or reduced based on the desired display magnification factor in the extraction image memory.

3. A projection display apparatus according to claim 1 or 2, wherein the image extraction section displays a predetermined extraction frame as the extraction area specifying image, the predetermined extraction frame having a first black outline, a second black outline inside the first black outline and a white area between the first and second black outlines.

4. A projection display apparatus according to claim 1, wherein the extraction image memory stores a plurality of extraction image data representing a plurality of extraction images; and the specific image display control section displays a specific image that include at least one extraction image selected from among the plurality of extraction images in the specific operating condition.

5. A projection display apparatus according to claim 4, wherein the specific image display control section selects at least two of the extraction images from among the plurality of extraction images and displays the selected images in order.

6. A projection display apparatus according to claim 1, further comprising an operating condition judging section that judges if the projection display apparatus is in the specific operating condition, wherein the specific image display control section displays the specific image when the specific operating condition is detected by the operating condition judging section.

7. A projection display apparatus that projects images, comprising:

a frame memory for storing image data representing an image to be displayed;

an image display signal generator for generating image display signals based on the image data stored in the frame memory;

an electro-optical device for emitting light to form images in response to the image display signals;

a projection optical system for projecting light emitted by the electro-optical device;

an operating condition judging section that judges if the projection display apparatus is in a specific operating condition, the specific operating condition including at least one of a state in which no image signal is being given to the projection display apparatus and a state in which a prescribed period has not elapsed after the startup of the projection display apparatus; and a specific image display control section that displays the specific image represented by the specific image data when the operating condition judging section detects the specific operating condition.

8. An image display apparatus that displays images, comprising:

a frame memory for storing image data representing an image to be displayed;

an image display signal generator for generating image display signals based on the image data stored in the frame memory;

an electro-optical device for emitting light to form images in response to the image display signals;

an image extraction section that extracts at least a portion of an extraction target image selected arbitrarily from among images given externally as an extraction image;

an extraction image memory for storing extraction image data representing the extraction image; and a specific image display control section that displays a specific images represented by specific image data including the extraction image data stored in the extraction image memory in a specific operating condition, the specific operating condition including at least one of a state in which no image signal is being given to the projection display apparatus and a state in which a prescribed period has not elapsed after the startup of the projection display apparatus.

9. An image display apparatus that displays images, comprising:

a frame memory for storing image data representing an image to be displayed;

an image display signal generator for generating image display signals based on the image data stored in the frame memory;

an electro-optical device for emitting light to form images in response to the image display signals;

an operating condition judging section that judges if the image display apparatus is in a specific operating condition, the specific operating condition including at least one of a state in which no image signal is being given to the projection display apparatus and a state in which a prescribed period has not elapsed after the startup of the projection display apparatus; and a specific image display control section that displays a specific image represented by specific image data when the operating condition judging section detects the specific operating condition.

10. A method of displaying a specific image using a projection display apparatus, comprising the steps of:

extracting at least a portion of a given extraction target image as an extraction image;

preparing extraction image data representing the extraction image; and displaying a specific image represented by specific image data including the extraction image data in a specific operating condition, the specific operating condition including at least one of a state in which no image signal is being given to the projection display apparatus and a state in which a prescribed period has not elapsed after the startup of the projection display apparatus.

11. A method of displaying a specific image using a projection display apparatus, comprising the steps of:

judging if the projection display apparatus is in a specific operating condition, the specific operating condition including at least one of a state in which no image signal is being given to the projection display apparatus and a state in which a prescribed period has not elapsed after the startup of the projection display apparatus;

when it is judged that the projection display apparatus is in the specific operating condition, storing specific image data to a frame memory to display a specific image represented by specific image data.

* * * * *

(12) EX PARTE REEXAMINATION CERTIFICATE (8313th)
United States Patent
Itoh et al.

(10) Number: US 6,831,661 C1
(45) Certificate Issued: Jun. 7, 2011

(54) PROJECTION DISPLAY APPARATUS, DISPLAY METHOD FOR SAME AND IMAGE DISPLAY APPARATUS

(75) Inventors: Takafumi Itoh, Matsumoto (JP); Shoichi Akaiwa, Matsumoto (JP)

(73) Assignee: Seiko Epson Corporation, Tokyo (JP)

Reexamination Request:
No. 90/009,770, Jun. 30, 2010

Reexamination Certificate for:
Patent No.: 6,831,661
Issued: Dec. 14, 2004
Appl. No.: 09/632,221
Filed: Aug. 3, 2000

Related U.S. Application Data

(63) Continuation of application No. PCT/JP99/00467, filed on Feb. 3, 1999.

(51) Int. Cl.
G09G 5/00 (2006.01)

(52) U.S. Cl. .................. 345/629; 345/625; 345/628; 345/634; 345/636; 345/638

(58) Field of Classification Search .............. 345/629
See application file for complete search history.

(56) References Cited

U.S. PATENT DOCUMENTS

| | | | |
|---|---|---|---|
| 4,846,694 A | 7/1989 | Erhardt | |
| 4,982,279 A | 1/1991 | Ishii et al. | |
| 5,142,373 A | 8/1992 | Akiyama et al. | |
| 5,150,200 A | 9/1992 | Hong | |
| 5,311,317 A | 5/1994 | Ogura et al. | |
| 5,523,958 A | 6/1996 | Takeuchi | |
| 7,170,531 B2 | 1/2007 | Itoh et al. | |
| 7,176,850 B1 | 2/2007 | Itoh et al. | |

FOREIGN PATENT DOCUMENTS

| | | |
|---|---|---|
| JP | A-04-038570 | 2/1992 |
| JP | 4-284495 | 10/1992 |
| JP | A-06-295339 | 10/1994 |
| JP | A-07-129136 | 5/1995 |
| JP | A-08-029871 | 2/1996 |
| JP | A-09-277783 | 10/1997 |
| JP | A-10-164467 | 6/1998 |
| JP | A-11-064814 | 3/1999 |
| JP | B2-2979588 | 9/1999 |
| WO | WO99/40563 A | 8/1999 |

*Primary Examiner* — Colin LaRose

(57) ABSTRACT

The present invention provides a technology that enables related portions of multiple pages of images to be displayed simultaneously. A projection display apparatus comprises: an image extraction section that extracts at least a portion of given first image data as an extraction image; an extraction image memory for storing extraction image data representing the extraction image; an image overlay section that generates overlaid image data by superimposing the extraction image on an original image represented by given second image data; a light modulation unit that is driven responsive to the overlaid image data pixel by pixel; and an optical system for projecting onto the screen the overlaid image obtained by the light modulation unit. A projection display apparatus can display related portions of multiple pages of images simultaneously.

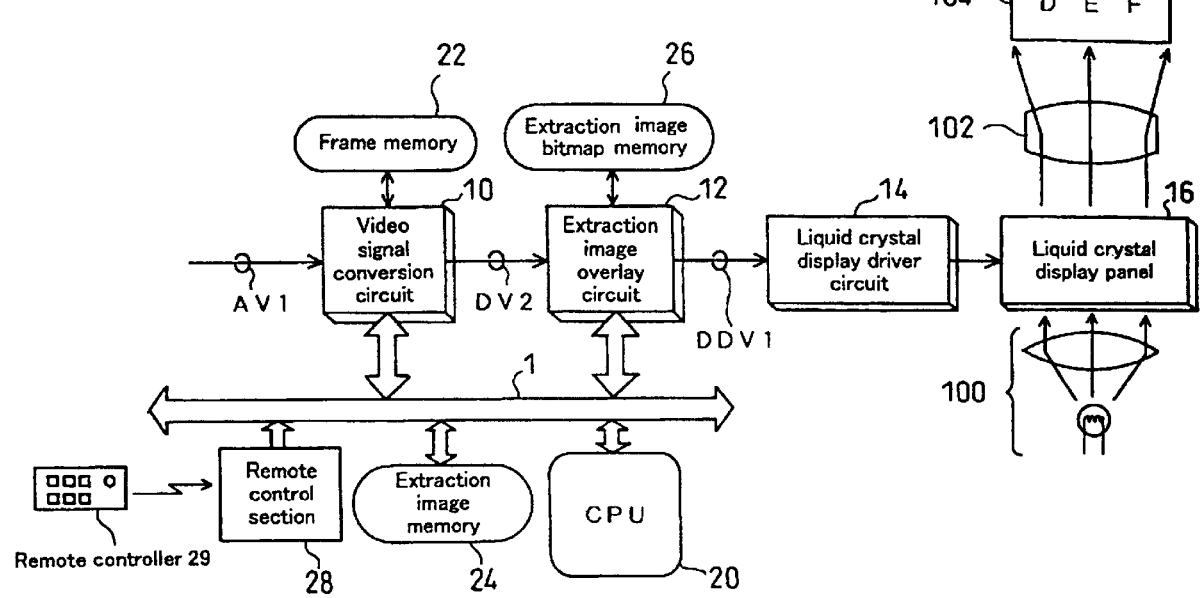

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 10 is confirmed.

Claims 1, 7, 8, 9, and 11 are determined to be patentable as amended.

Claims 4-6, dependent on an amended claim, are determined to be patentable.

New claims 12-17 are added and determined to be patentable.

Claims 2 and 3 were not reexamined.

1. A projection display apparatus that projects images onto a screen, comprising:
   a frame memory for storing image data representing an image to be displayed;
   an image display signal generator for generating image display signals based on the image data stored in the frame memory;
   an electro-optical device for [emitting] *modulating* light to form images in response to the image display signals;
   a projection optical system for projecting light [emitted] *modulated* by the electro-optical device;
   an image extraction section that extracts at least a portion of an extraction target image selected arbitrarily from images given externally as an extraction image;
   an extraction image memory for storing extraction image data representing the extracting image; and
   a specific image display control section that displays a specific image represented by specific image data including the extraction image data stored in the extraction image memory in a specific operating condition, the specific operating condition including at least one of a state in which no image signal is being given to the projection display apparatus and a state in which a prescribed period has not elapsed after the startup of the projection display apparatus.

7. A projection display apparatus that projects images, comprising:
   a frame memory for storing image data representing an image to be displayed;
   an image display signal generator for generating image display signals based on the image data stored in the frame memory;
   an electro-optical device for [emitting] *modulating* light to form images in response to the image display signals;
   a projection optical system for projecting light [emitted] *modulated* by the electro-optical device;
   an operating condition judging section that judges if the projection display apparatus is in a specific operating condition, the specific operating condition [including at least one of a state in which no image signal is being given to the projection display apparatus and] *being* a state in which a prescribed period has not elapsed after the startup of the projection display apparatus; and
   a specific image display control section that displays the specific image represented by the specific image data when the operating condition judging section detects the specific operating condition.

8. An image display apparatus that displays images, comprising:
   a frame memory for storing image data representing an image to be displayed;
   an image display signal generator for generating image display signals based on the image data stored in the frame memory;
   an electro-optical device for [emitting] *modulating* light to form images in response to the image display signals;
   an image extraction section that extracts at least a portion of an extraction target image selected arbitrarily from among images given externally as an extraction image;
   an extraction image memory for storing extraction image data representing the extraction image; and
   a specific image display control section that displays a specific [images] *image* represented by specific image data including the extraction image data stored in the extraction image memory in a specific operating condition, the specific operating condition including at least one of a state in which no image signal is being given to the projection display apparatus and a state in which a prescribed period has not elapsed after the startup of the projection display apparatus.

9. An image display apparatus that displays images, comprising:
   a frame memory for storing image data representing an image to be displayed;
   an image display signal generator for generating image display signals based on the image data stored in the frame memory;
   an electro-optical device for [emitting] *modulating* light to form images in response to the image display signals;
   an operating condition judging section that judges if the image display apparatus is in a specific operating condition, the specific operating condition [including at least one of a state in which no image signal is being given to the projection display apparatus and] *being* a state in which a prescribed period has not elapsed after the startup of the projection display apparatus; and
   a specific image display control section that displays a specific image represented by specific image data when the operating condition judging section detects the specific operating condition.

11. A method of displaying a specific image using a projection display apparatus, comprising the steps of:
   judging if the projection display apparatus is in a specific operating condition, the specific operating condition [including at least one of a state in which no image signal is being given to the projection display apparatus and] *being* a state in which a prescribed period has not elapsed after the startup of the projection display apparatus;

when it is judged that the projection display apparatus is in the specific operating condition, storing specific image data to a frame memory to display a specific image represented by specific image data.

12. A projection display apparatus that projects images, comprising:

a frame memory for storing image data representing an image to be displayed;

an image display signal generator for generating image display signals based on the image data stored in the frame memory;

an electro-optical device for modulating light to form images in response to the image display signals;

a projection optical system for projecting light modulated by the electro-optical device;

an operating condition judging section that judges if the projection display apparatus is in a specific operating condition, the specific operating condition being a state in which no image signal is being given to the projection display apparatus; and a specific image display control section that displays the specific image represented by the specific image data when the operating condition judging section detects the specific operating condition, the specific image including a user-specified image.

13. A projection display apparatus that projects images, comprising:

a frame memory for storing image data representing an image to be displayed;

an image display signal generator for generating image display signals based on the image data stored in the frame memory;

an electro-optical device for modulating light to form images in reponse to the image display signals;

a projection optical system for projecting light modulated by the electro-optical device;

an operating condition judging section that judges if the projection display apparatus is in a specific operating condition, the specific operating condition being a state in which no image signal is being given to the projection display apparatus; and a specific image display control section that displays the specfic image represented by the specific image data when the operating condition judging section detects the specific operating condition, the specific image including a logo.

14. An image display apparatus that displays images, comprising:

a frame memory for storing image data representing an image to be displayed;

an image display signal generator for generating image display signals based on the image data stored in the frame memory;

an electro-optical device for modulating light to form images in response to the image display signals;

an operating condition judging section that judges if the image display apparatus is in a specific operating condition, the specific operating condition being a state in which no image signal is being given to the projection display apparatus; and a specific image display control section that displays a specific image represented by specific image data when the operating condition judging section detects the specific operating condition, the specific image including a user-specified image.

15. An image display apparatus that displays images, comprising:

a frame memory for storing image data representing an image to be displayed;

an image display signal generator for generating image display signals based on the image data stored in the frame memory;

an electro-optical device for modulating light to form images in response to the image display signals;

an operating condition judging section that judges if the image display apparatus is in a specific operating condition, the specific operating condition being a state in which no image signal is being given to the projection display apparatus; and a specific image display control section that displays a specific image represented by specific image data when the operating condition judging section detects the specific operating condition, the specific image including a logo.

16. A method of displaying a specific image using a projection display apparatus, comprising the steps of:

judging if the projection display apparatus is in a specific operating condition, the specific operating condition being a state in which no image signal is being given to the projection display apparatus;

when it is judged that the projection display apparatus is in the specific operating condition, storing specific image data to a frame memory to display a specific image represented by specific image data, the specific image including a user-specified image.

17. A method of displaying a specific image using a projection display apparatus, comprising the steps of:

judging if the projection display apparatus is in a specific operating condition, the specific operating condition being a state in which no image signal is being given to the projection display apparatus;

when it is judged that the projection display apparatus is in the specific operating condition, storing specific image data to a frame memory to display a specific image represented by specific image data, the specific image including a logo.

* * * * *